US010752765B2

(12) United States Patent
 Croisier et al.

(10) Patent No.: US 10,752,765 B2
(45) Date of Patent: Aug. 25, 2020

(54) BLENDS OF OLIGOPEPTIDE TERMINAL POLYISOBUTYLENE OR POLYSTYRENE

(71) Applicant: ECOLE POLYTECHNIQUE FEDERALE DE LAUSANNE (EPFL), Lausanne (CH)

(72) Inventors: Emmanuel Croisier, Lausanne (CH); Holger Frauenrath, Lausanne (CH); Su Liang, Lausanne (CH); Veronique Michaud, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 262 days.

(21) Appl. No.: 14/646,950

(22) PCT Filed: Nov. 26, 2013

(86) PCT No.: PCT/EP2013/074793
 § 371 (c)(1),
 (2) Date: May 22, 2015

(87) PCT Pub. No.: WO2014/080043
 PCT Pub. Date: May 30, 2014

(65) Prior Publication Data
 US 2015/0307701 A1 Oct. 29, 2015

(30) Foreign Application Priority Data

Nov. 26, 2012 (GB) .................................. 1221246.0

(51) Int. Cl.
| C08L 23/36 | (2006.01) |
| C08L 23/22 | (2006.01) |
| C08L 89/00 | (2006.01) |
| C08H 1/00 | (2006.01) |
| C08L 25/06 | (2006.01) |

(Continued)

(52) U.S. Cl.
CPC ................ C08L 23/36 (2013.01); C08H 1/00 (2013.01); C08L 23/22 (2013.01); C08L 25/06 (2013.01); C08L 89/00 (2013.01); C09D 123/36 (2013.01); C09D 125/06 (2013.01); C08L 2205/02 (2013.01); C08L 2205/025 (2013.01)

(58) Field of Classification Search
CPC .......... C08L 23/36; C08L 25/06; C08L 89/00; C08L 23/22; C08H 1/00; C09D 123/36; C09D 125/06
See application file for complete search history.

(56) References Cited

U.S. PATENT DOCUMENTS

| 2010/0166820 A1 | 7/2010 | Boden et al. |
| 2012/0135070 A1 | 5/2012 | Kros et al. |
| 2012/0271003 A1 | 10/2012 | Konig et al. |

FOREIGN PATENT DOCUMENTS

WO  WO 2010/124829  * 11/2010  ............. C08G 69/10

* cited by examiner

*Primary Examiner* — John E Uselding
(74) *Attorney, Agent, or Firm* — Howson & Howson LLP

(57) ABSTRACT

Various blends of polymers are disclosed, comprising oligopeptide functionalised polymers such as polyisobutylene and polystyrene. Mono-functionalised and di-functionalised polymers (each containing 0 to 5 peptide units beyond its terminal amide group) may be blended with each other and/or with non-functionalised polymers to produce blended compositions. Such compositions are of use, for example, in vibrations dampers. Certain blends also exhibit self-healing properties.

26 Claims, 24 Drawing Sheets

(51) Int. Cl.
*C09D 123/36* (2006.01)
*C09D 125/06* (2006.01)

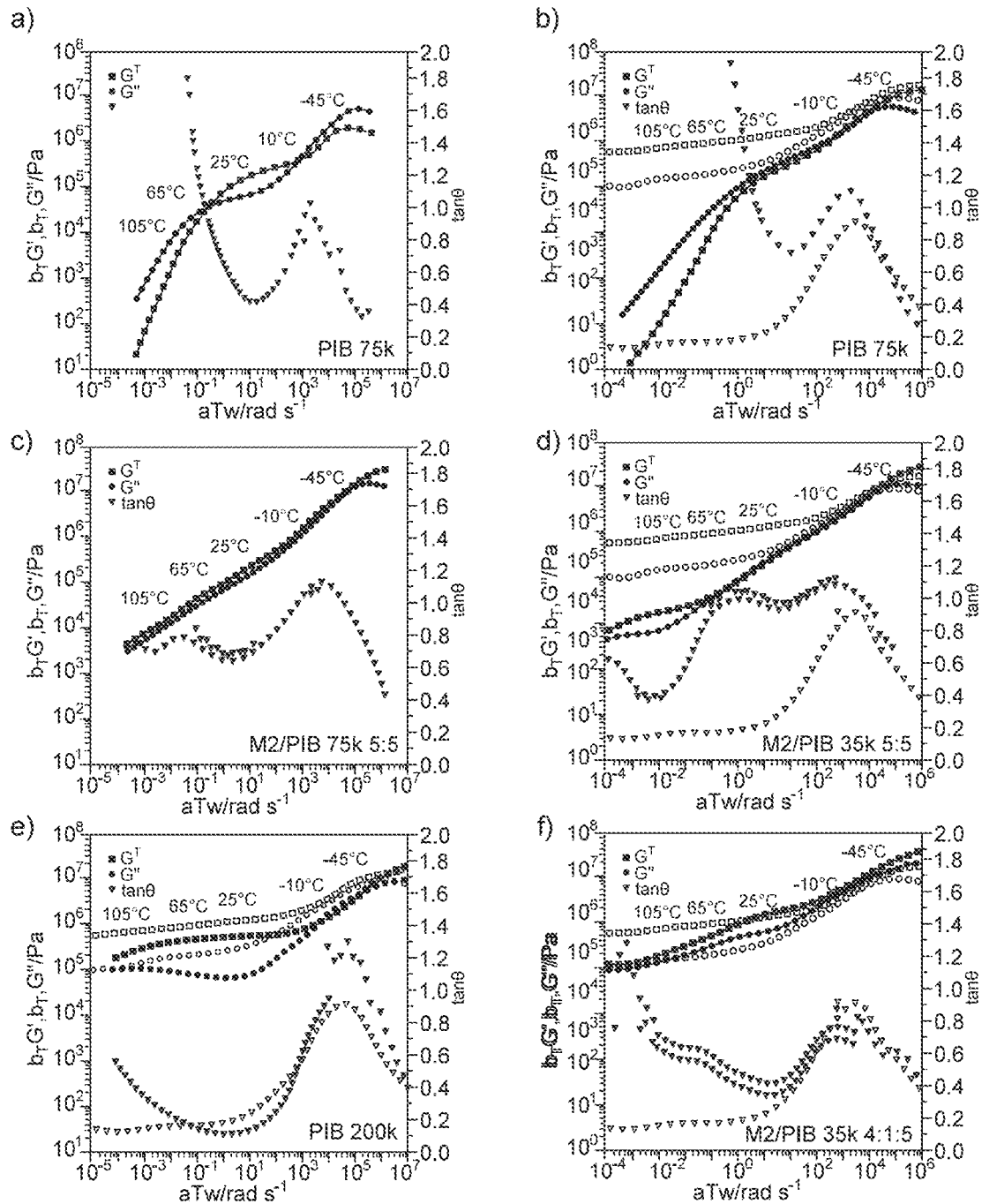
FIG. 20 (a-f)

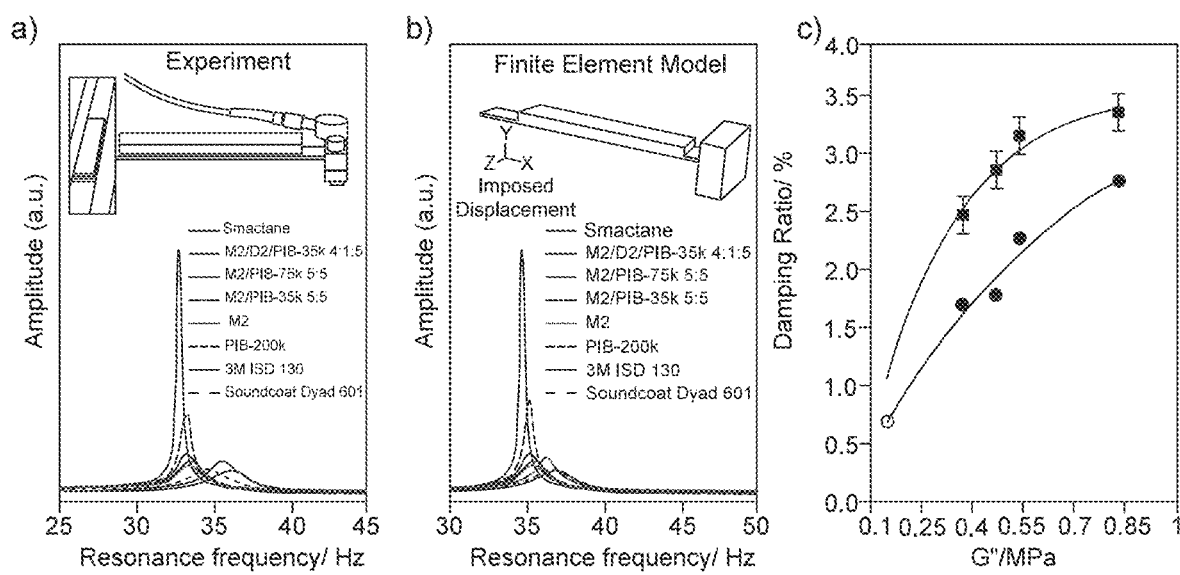
FIG. 21 (a-c)

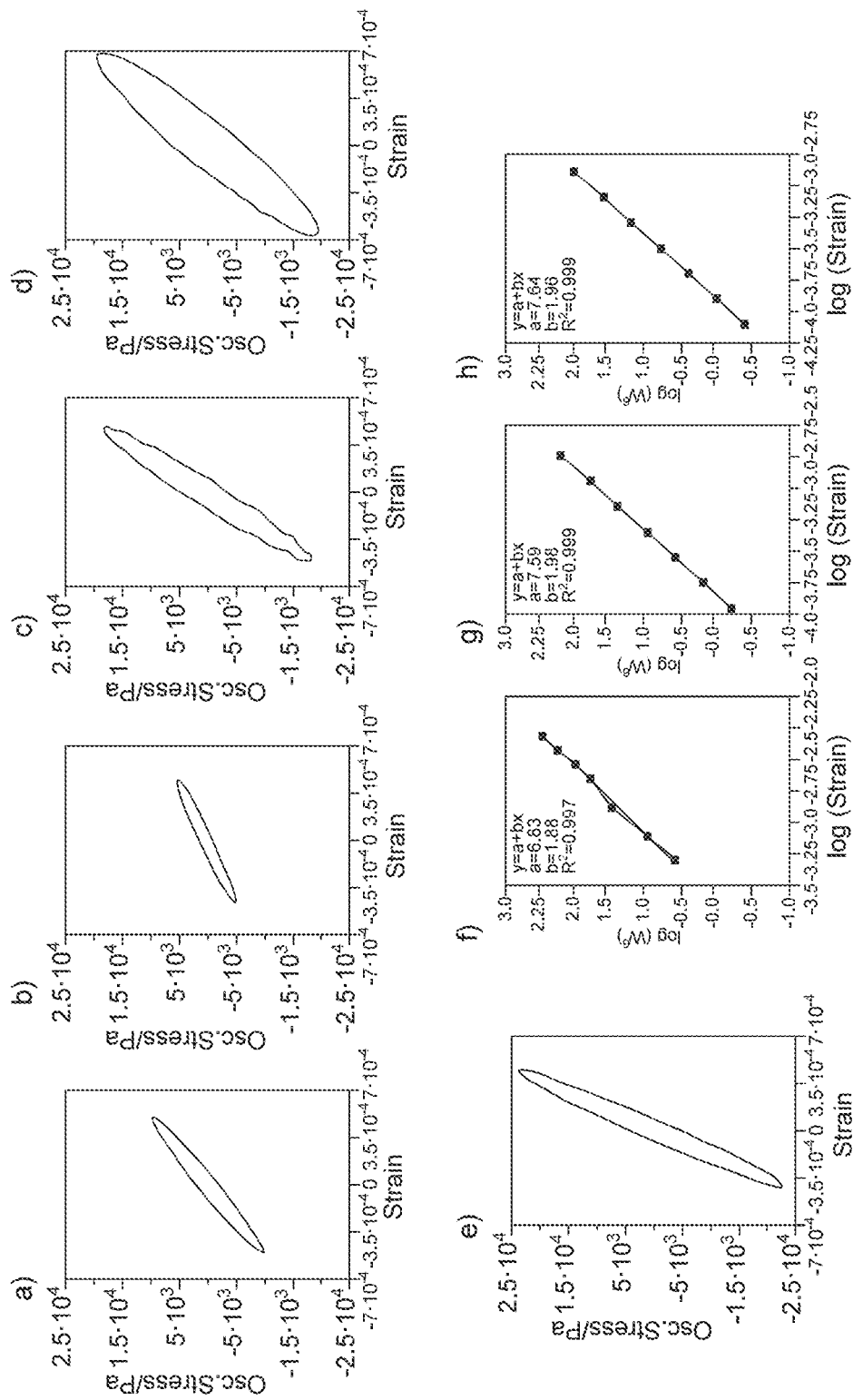
FIG. 22 (a-h)

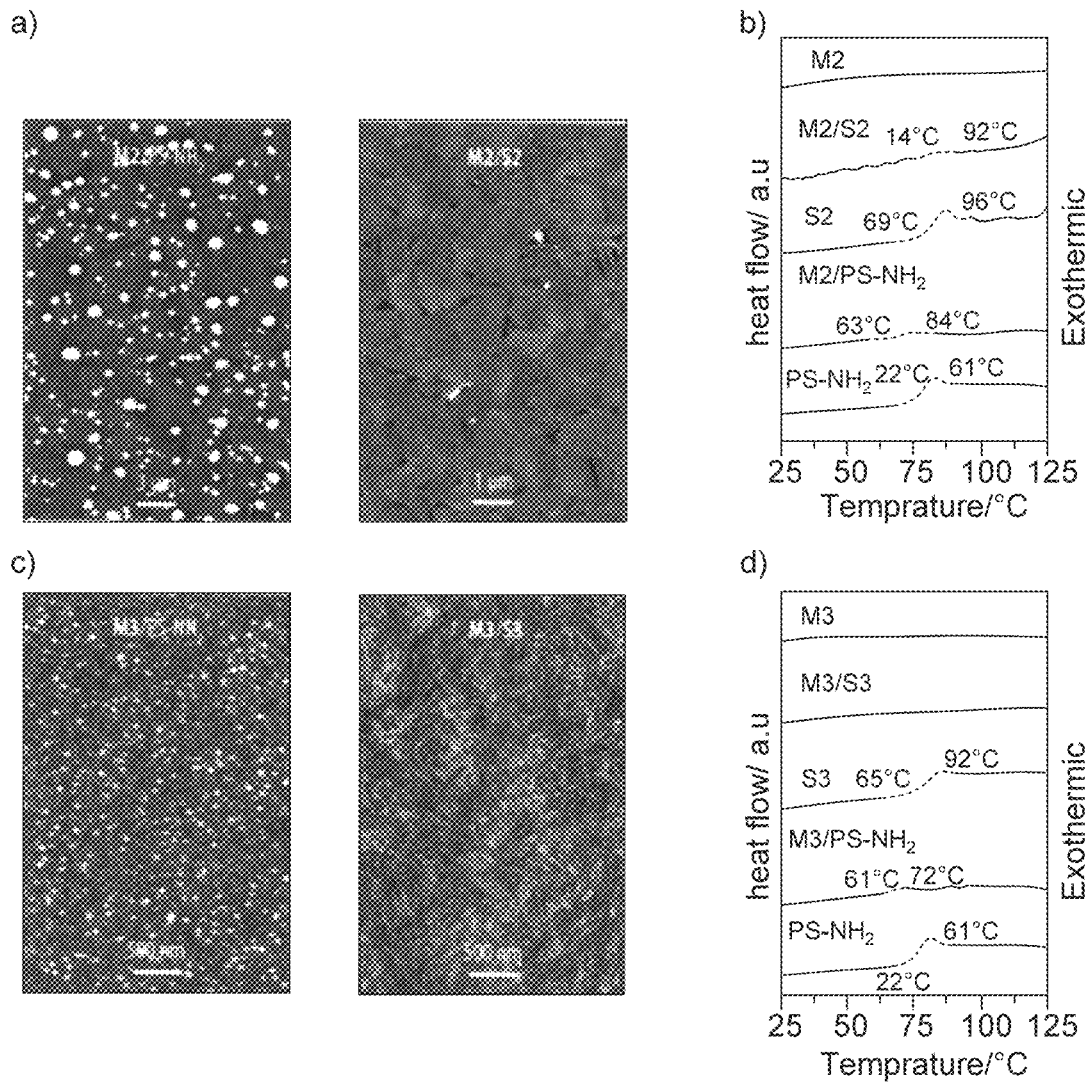
FIG. 23 (a-d)

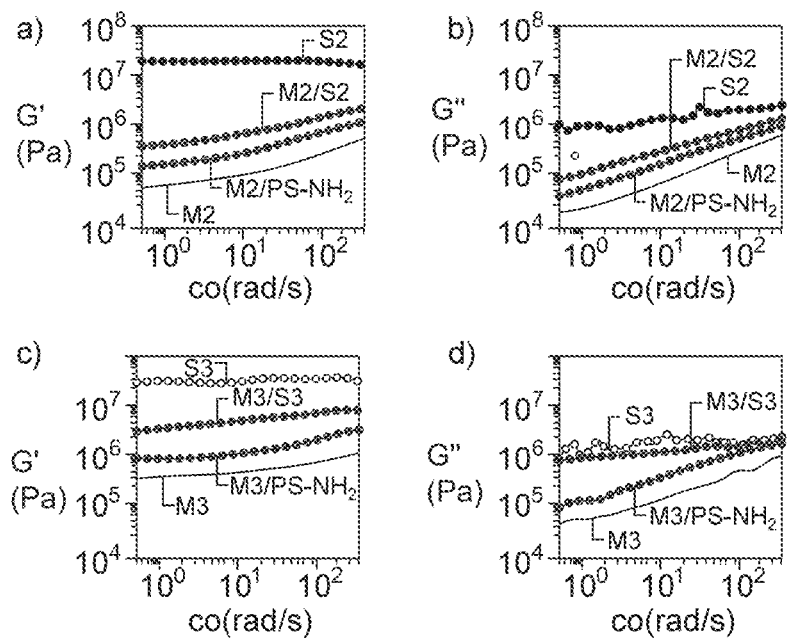
FIG. 24 (a-d)
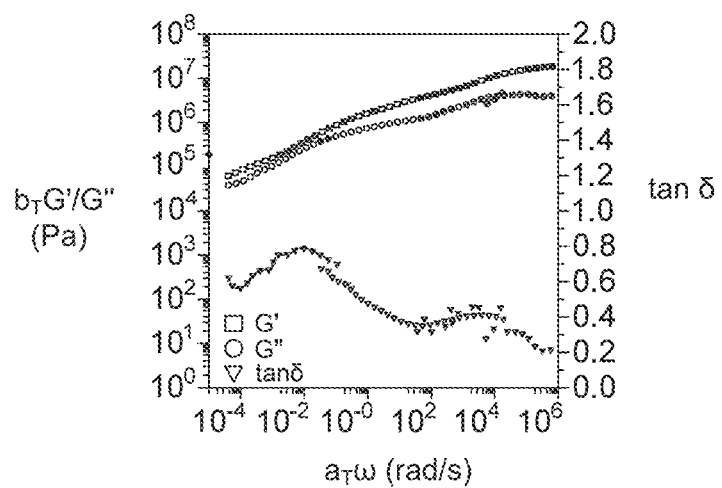
FIG. 25

BLENDS OF OLIGOPEPTIDE TERMINAL POLYISOBUTYLENE OR POLYSTYRENE

FIELD OF THE INVENTION

This invention relates to polymer blends, in particular to blends of polymers with oligopeptide end groups (named oligopeptide-terminal polymers in the following), and in particular to blends of oligopeptide-terminal polyisobutylenes, polyisoprenes, polystyrenes and copolymers of the aforementioned polymers. It also relates to the use of materials from such blends, for example as reinforced, shape-persistent thermoplastic elastomers, as vibration damping materials, as self-healing materials and in other applications.

In typical thermoplastic materials, the polymer molecules start to flow along each other upon heating, so that the material can be macroscopically deformed. If this already happens at room temperature, albeit very slowly, the terms "creep" or "cold flow" are typically deployed. Materials exhibiting creep are not form-stable; they may be useful in certain applications but inadequate for others where shape-persistence is important.

In typical elastomers (rubbers), the polymer molecules are linked together by chemical (covalent) bonds to form a three-dimensional, covalently linked network of chains with loops and holes. The chain segments cannot move anymore, and on trying to deform the material macroscopically, it will retain its original shape upon release of the deforming force (this is what makes the material a rubber). As covalent bonds only break when the material is destroyed at high temperatures, the covalent networks are irreversibly formed and stable.

High molecular weight polyisobutylene is widely used commercially as a thermoplastic material. It shows elastomeric behaviour to a certain degree due to chain entanglement but, unless covalently cross-linked ("butyl rubber") shows a large degree of creep.

Interpenetrating polymer networks (IPNs) are elastomers that contain two (or more) independent, mechanically inter-locked (interpenetrating) three-dimensional covalent networks consisting of different types of polymers. Firstly one type of covalent network is formed from the first type of polymer chains by covalently connecting (cross-linking) them by a chemical reaction. Then the second type of polymer chains that fill the loops and holes of the first network are cross-linked by a chemical reaction. IPNs are useful as or in vibration damping materials. Without wishing to be bound by theory, we postulate that by subjecting such an IPN to a vibration of a certain frequency, only one of the two independent networks will start to respond (assuming the two types of polymers have different mechanical properties, e.g., stiffness) so that at the molecular level, the segments of this network apparently start to move along the segments of the other network, which dissipates energy and thus damps the vibration.

Mechanical vibration damping is highly desirable for structures, in order to maintain their stability, performance and durability. Vibration damping is typically achieved by either "active damping", using sensors and actuators such as piezoelectric devices, or "passive damping" by means of materials that dissipate vibrational energy. Due to their viscoelastic properties, polymer materials are useful passive damping materials. Since the "loss factor" tan δ (defined as the ratio of loss and storage modulus, such as G"/G' in shear mode) as a measure of the material's intrinsic damping properties attains its highest values around the material's glass transition temperature, factors that control the latter are an important aspect of research in the field of damping materials. For instance, small molecule additives have successfully been used as plasticizers, in order to broaden the glass transition region. "Interpenetrating polymer networks" (IPNs), on the other hand, often feature a superposition of the damping properties of the constituting homopolymers and, thus, offer opportunities for materials with excellent damping performance over large temperature or frequency ranges. Finally, the incorporation of inorganic nanostructures or fibres as reinforcing fillers typically leads to a raising and broadening of the loss factor maximum around the glass transition temperature of the polymer matrix. This effect is particularly pronounced for fibres with a low aspect ratios such as carbon whiskers or short microfibers. Moreover, it was demonstrated, that the interface properties between the matrix and the reinforcement strongly influence the energy dissipation mechanisms, with intermediate "interface friction" providing increased damping.

In contrast to true elastomers described above, "supramolecular materials" are an example of so-called "thermoplastic elastomers" (TPEs). In TPEs, the polymer chains are cross-linked (as per elastomers), but the network points (cross-links) are not covalent bonds (unlike elastomers). Instead, the network points are "weak" non-covalent bonds (secondary bonds, supramolecular interactions, such as electrostatic interactions, hydrogen bonds, dipolar interactions, or Van der Waals interactions) that create stable network points but are weak enough to be reversibly broken/re-formed upon heating/cooling. This means that the material is a three-dimensional network and behaves like an elastomer at temperatures below the critical temperature where the supramolecular interactions start to be disrupted. Above this temperature, the network is broken, the polymer chains can flow, and so the material becomes thermoplastic and can be macroscopically deformed. This is advantageous because it enables processing the material into any desired shape, and also from a sustainability standpoint allowing a measure of re-use and recycling.

In some cases, the reversible disruption/re-formation of the networks can even dynamically happen at room temperature (or under mild heating or mechanical treatment). In this case, the materials may show a degree of "self-healing". This means that, by macroscopically damaging as by cutting for example, the material, the damage may heal just by itself, because molecules from both sides of the crack apparently can "leave" their network and reform a network with molecules from the other side.

In the prior art document WO 2011/045309 (BASF SE) individual oligopeptide-terminal polymers as fall within definition (a) herein and (b) herein (see e.g. claim 1 herein) have been disclosed along with their preparation and some postulated uses, but of an entirely different nature. However, in that prior patent, there is no disclosure or suggestion of blends of different oligopeptide-terminated polymers or of blends of oligopeptide-terminated polymers with other polymers such as medium or high molecular weight PIB. Still less, is there any suggestion of the particular advantageous properties, discovered now, attributable to such blends.

SUMMARY OF THE INVENTION

The invention provides, in one aspect, a polymer blend comprising: at least two (a) monofunctional oligopeptide terminal polymers, or at least two (b) difunctional oligopeptide terminal polymers.

The invention also provides a polymer blend comprising: at least one polymer (a) as defined above, together with at least one polymer (b) as defined above.

The invention further provides, in an alternative aspect, a polymer blend comprising: at least two (a) monofunctional oligopeptide-terminated hydrophobic flexible polymers, or at least two (b) difunctional oligopeptide-terminated hydrophobic flexible polymers, or at least one of (a) together with at least one of (b) as defined above.

In a further alternative aspect, the invention provides a polymer blend comprising: at least two (a) monofunctional oligopeptide-terminated hydrophobic polymers, or at least two (b) difunctional oligopeptide-terminated hydrophobic polymers, or at least one of (a) together with at least one of (b) as defined above.

In some embodiments, the polymer blend may further comprise at least one (c) non-functionalised polymer, such as an isobutylene polymer. The non-functionalised polymer may have, for example, a molecular weight exceeding 10,000.

The invention also extends to a polymer blend comprising: at least one polymer (c) as defined above, and at least one polymer (a) as defined above and/or at least one polymer (b) as defined above.

In some embodiments, polymers (a), (b) and/or (c) comprise repeating units selected from isobutylene, butadiene, siloxane, acrylate, fluoropolymer, isoprene or styrene units. In some embodiments, the polymer segment of polymer (a) and/or (b) and/or (c), may be selected from the group consisting of: poly(isobutylene-co-isoprene), polyisoprene, polybutadiene, a polysiloxane (in particular poly(dimethylsiloxane)), a polyacrylate (in particular poly(methyl acrylate) or poly(butyl acrylate)), poly(ethylene-co-butylene), hydrogenated poly(isoprene), hydrogenated poly(butadiene), or a fluoropolymer (in particular poly(tetrafluoroethylene), and poly(tetrafluoroethylene-co-ethylene).

Polymers (a) and (b) may, in some embodiments, comprise the same type of polymer segment. Where present, polymer (c) may, in some embodiments, comprise the same type of polymer segment as polymer (a) and/or (b).

In some particular embodiments, the blend comprises oligopeptide-terminated isobutylene polymer with oligopeptide-terminated styrene polymer.

Polymers (a), (b) and/or (c) may comprise, for example, flexible hydrophobic polymers.

In some embodiment, the oligopeptide-terminated polymer (a) may have from 0 to 5 (for example 2 to 5) peptide units beyond its terminal amide group and/or polymer (b) may have, at each end, 0 to 5 (for example 2 to 5) peptide units beyond its terminal amide groups.

The oligopeptide moiety of polymer (a) and/or (b) may comprise, for example, L-alanine units. In some embodiments, the oligopeptide moiety consists only of such units.

The polymer segment of polymer (a) and/or (b) and/or, if present, (c), may, in some embodiments, be a hydrophobic polymer with a glass transition temperature below 20° C.

Polymer blends according to the invention may, for example, be in the form of shape-persistent thermoplastic elastomers.

In some embodiments, the polymer blend may comprise interpenetrating supramolecular polymer networks in which two or more specific supramolecular interactions result in the formation of two or more independent, interpenetrating supramolecular networks with different transition (deaggregation) temperatures.

The invention also extends to vibration damping materials comprising the polymer blends of the invention.

Some embodiments of vibration damping material comprise: (i) monofunctional oligopeptide terminal polyisobutylene, having from 2 to 5 peptide units beyond its terminal amide group; and (ii) monofunctional oligopeptide terminal polystyrene, having from 2 to 5 peptide units beyond its terminal amide group.

The vibration damping material may, in some embodiments, additionally comprise: (iii) a high molecular weight non-functionalised polymer.

Further particular embodiments of vibration damping material according to the invention include, by way of example—
  A.—a material comprising: (i) monofunctional oligopeptide terminal polyisobutylene, having from 2 to 5 peptide units beyond its terminal amide group; and (ii) non-functionalised polyisobutylene; wherein the monofunctional oligopeptide terminal polyisobutylene may, for example, have 2 peptide units beyond its terminal amide group; and
  B.—a material comprising: (i) monofunctional oligopeptide terminal polyisobutylene, having from 0 to 5 peptide units beyond its terminal amide group; (ii) difunctional oligopeptide terminal polyisobutylene, having from 0 to 5 peptide units beyond its terminal amide group; and (iii) non-functionalised polyisobutylene; wherein each of oligopeptide terminal polyisobutylene polymers (i) and (ii) has the same number of peptide units beyond its terminal amide group; wherein each of oligopeptide terminal polyisobutylene polymers (i) and (ii) may, for example, have 2 peptide units beyond its terminal amide group.

Vibration damping materials according to the invention may, for example, be composite materials including one or more other components, such as one or more of the following: a plasticizer or a reinforcing filler (such as carbon fibre, carbon black, silica particles).

Vibration damping materials of the invention may be used, for example, in a form adapted to reduce vibration within a vehicle, such as in the form of a pad or other layer which can be interposed between members of such vehicle subject to vibration. The invention also extends to vehicles which incorporate such damping materials, for example motor vehicles and aerospace vehicles.

In alternative aspects, the invention provides the use of any of the polymer blends of the invention as a damping material and to a method of vibration damping which involves the use of any of the polymer blends of the invention upon or within a structure such as a vehicle.

Moreover, the present invention also embraces polymer blends of monofunctional and/or difunctional oligopeptide-terminated polymers and/or the corresponding non-functional, higher molecular weight polymers of flexible hydrophobic polymers other than polyisobutylene, such as polyisoprene, polybutadiene, polysiloxanes, polyacrylates, or fluoropolymers.

The present invention embraces, for example, blends of monofunctional oligopeptide-terminated polyisobutylenes with oligopeptide segments comprising 0-5 amino acid repeating units (designated for convenience M0-M5) and/or their difunctional analogues (similarly designated for convenience as D0-D5) and/or oligopeptide-terminated polystyrene with oligopeptide segments comprising 0-5 amino acid repeating units (designated for convenience S0-S5) and/or oligopeptide-terminated polymers other than polyisobutylene/polystyrene (such as polybutadiene, polyisoprene, hermogravime, polyacrylates, polymethacrylates, or copolymers of any of the aforementioned polymers including polyisobutylene and polystyrene) with oligopeptide segments comprising 0-5 amino acid repeating units (designated for convenience P0-P5) and/or (optionally high molecular weight) non-functionalised polyisobutylenes of different grades (molecular weights) and/or flexible hydrophobic polymers other than polyisobutylene, such as polybutadiene, polyisoprene, polysiloxanes, polyacrylates, or fluoropolymers, or copolymers of any of the aforementioned polymers including polyisobutylene and polystyrene.

The above blend(s), if required, can be used as a precursor blend to be admixed with other non-functionalised, higher molecular weight hydrophobic flexible polymer such as polyisobutylene, to form the preferred thermoplastic elastomer polymer blends of the invention. Alternatively just one polymer (a) or (b) as defined herein may be admixed with the non-functionalised, higher molecular weight hydrophobic flexible polymer, such as polyisobutylene.

These blends result in materials with novel properties because the oligopeptides deployed in the present invention form aggregates by hydrogen-bonding between the peptide groups; they are chiral; and their (exact) length determines what kind of aggregates form; and this length-dependence is not only selective but even specific (self-sorting) so that different types of aggregates can persist in mixtures. The present invention also embraces polymer blends using oligopeptide terminal groups based on other amino acids apart from those specifically exemplified herein. Furthermore, whilst the present blends (materials) may be used on their own, they may also be used as the matrix material for a composite, that is, a reinforcing filler may be added into the present blends (such as carbon fibres, or carbon black, or silica particles). This may result in stronger, stiffer materials with the same beneficial damping properties.

Further optional and preferred features are to be found amongst the sub claims herein:
(1) Some preferred embodiments of these blends are materials that are "Inherently Reinforced Thermoplastic Elastomers" in which nanostructures formed by the aggregation of the oligopeptide segments act as reinforcing fillers. In particular, these materials are technologically advantageous because they are thermoplastic materials with increased mechanical moduli, low creep, and good thermal processability compared to the corresponding high molecular weight polymers alone. See in particular the manifold examples herein.
(2) Alternatively, further preferred embodiments of these blends result in the formation of novel "Interpenetrating Supramolecular Networks". In particular, these materials are technologically advantageous because they have excellent mechanical vibration damping properties. See in particular the manifold examples herein.
(3) Still, further preferred embodiments of these blends can be deployed as materials with self-healing properties.
(4) Lastly, further embodiments of the invention are in the physical form of composites which comprise the aforesaid polymer blends as well as reinforcing fillers. Such composites can also be used as damping materials with, for example, higher strength, stiffness, yet similar damping properties, showing a potential use of the present polymer blends materials as matrix materials for composites containing other desired or required components. These composites can also show self-healing properties.

The "Inherently Reinforced Thermoplastic Elastomer" embodiments can be derived from mixtures of molecules with oligopeptide termini of the same type and length. These embodiments are examples of TPEs (in regard to their properties) but are novel because they, due to the molecularly defined oligopeptide end groups, already form networks at very short segment lengths of these end groups, so the inherent properties of the employed polymer (polyisobutylene) do not alter too much. At the same time, they are "reinforced" by the nanostructures (the tapes and fibrils) formed by the oligopeptides when they aggregate, similar to reinforcing a polymer with a filler (e.g., carbon fibres) to make a high performance composite. As a result, we obtain materials with mechanical properties (moduli) matching or exceeding those of even high molecular weight polyisobutylene, although we prefer to use very low molecular weight material. The present materials can be employed for the same applications as high molecular weight polyisobutylene but can be thermally processed more easily, have better mechanical properties, show less creep, and are better from a sustainability standpoint (recycling elastomers).

Some preferred embodiments of the aforesaid "Inherently Reinforced Thermoplastic Elastomer" embodiments can be derived from mixtures of oligopeptide-terminated flexible polymers such as polyisobutylene with oligopeptide-terminated glassy polymers such as polystyrene or its copolymers. In particular, these embodiments are novel because the phase segregation of the immiscible polymers competes with the formation of the oligopeptide aggregates in the blends. Different from the microphase segregation observed in typical block copolymers with domain sizes on the order of tens of nanometers and above, this results in separated domains of the immiscible flexible and amorphous polymers with diameters on the order of nanometers to tens of nanometers that are, in addition, connected by the oligopeptide aggregates. This creates a network of nanoscopic oligopeptide aggregates and nanoscale glassy domains with a particularly reinforcing effect, even at small weight fractions of the oligopeptide-terminated glassy polymers.

The "Interpenetrating Supramolecular Networks" embodiments are also novel and are obtained from mixtures of molecules with oligopeptide termini of different type (oligopeptide sequence) or length, including non-functionalized, higher molecular weight polymers. In these materials, there are two independent networks (similar to IPNs), but both are formed by cross-links that are non-covalent, weak, secondary bonds (e.g. hydrogen bonding). What this requires is that the network formation relies on two "specific" (self-sorting) supramolecular interactions that can form without interfering with each other. In the materials provided by this invention, both types of networks rely on the same type of supramolecular interactions (that is, hydrogen-bonding between the peptide functions) between two just differently long oligopeptides. The resulting networks can be either a supramolecular, hydrogen-bonded network of difunctional molecules (such as D0-D5); or a "percolation network" of tapes and fibrils formed by hydrogen-bond-driven aggregation of monofunctional molecules (M2-M5); or a percolation network of aforementioned tapes and fibrils with "hard" domains formed from oligopeptide-terminated glassy polymers (S2-S5 or other P2-P5); or an entanglement network formed from the high molecular weight polymers.

In any case, these embodiments share structural aspects of IPNs (two mechanically interlocked networks) and thermoplastic elastomers (reversibility of network formation). These embodiments thus extend upon regular supramolecular networks and other examples of TPE (that contain no interpenetrating networks) and IPNs (that are formed from covalent networks), and as a result can function as excellent high performance damping materials whilst simultaneously allowing beneficial thermoplastic processing (into different shapes). Their processing is also flexible because it can be effected either above the temperature where the first network melts, or above the temperature when also the second network melts, with different results. Specifically, it is possible to heat above the melting temperature of both networks, process the material into the desired shape (by injection moulding, extrusion, or other required technique), then cool below the melting temperature of one network, let it form, then cool below the melting temperature of the second network to have it formed. In this way, an interpenetrating network can be created just by processing, without using additional chemical reaction steps (as is required for an IPN).

Some preferred embodiments of the aforesaid "Interpenetrating Supramolecular Networks" materials may also show self-healing properties. One network may hold the material in place while the other (the weaker) network may dynamically break/re-form, either spontaneously or by heating it above that network's melting temperature, or by "mechanical treatment" (exposing the material to, e.g., a mechanical vibration).

Advantageous properties of preferred embodiments of the present polymer blends include:

(1) Behaviour as reinforced thermoplastic elastomers, that is, rubbers with properties similar to or better than high molecular weight polyisobutylene alone, but yet which can be processed thermoplastically by melting upon heating. They are 'reinforced' by the oligopeptide nanostructures, resulting in improved mechanical moduli ("strength") and behave as materials with no or low "creep" (cold flow; that is, they keep their shape at room temperature). Commercial applications and industrial uses can mirror those of regular PIB (e.g., barrier materials) but their low creep and thermoplastic processing are unexpected advantages, (2) Behaviour as materials with extremely large loss factors (loss tangents tan delta) over large frequency and/or temperature ranges, i.e. apparent molecular level properties approaching liquids (at those mechanical frequencies and temperatures) although they are in fact solids. This finds potential application in matrix materials for self-healing applications (materials that can cure mechanical damages 'themselves'), (3) Significantly, excellent high-performance vibration damping materials. Vibration damping uses being abundant in automotive and aerospace engineering whereby embodiments of the present blends find substantial application (even in their non-optimized state, some embodiments of the present invention already match or out-perform optimised multi-component commercial formulations.

The materials disclosed in the present invention implement useful vibration damping properties in a novel way. Due to the formation of the aforesaid "interpenetrating supramolecular networks", these materials themselves combine the beneficial effects (with respect to energy dissipation upon mechanical excitation as needed for vibration damping) of low aspect ratio reinforcing fillers, interpenetrating networks, and low molecular weight poly(isobutylene) plasticizers. They, therefore, yield shape-persistent materials with excellent energy dissipation and damping properties over large frequency and temperature ranges, without the use of additional components such as additional fillers or plasticisers.

BRIEF DESCRIPTION OF THE DRAWINGS

In order that the invention may be further described, more easily appreciated and readily carried into effect by those skilled in the art, reference will now be made to embodiments by way of non-limiting example only and with reference to the accompanying drawings, in which:

FIG. 21 shows an experimental setup for a random vibration modal analysis test on a sandwich structure comprising a damping layer, and FIG. 22 a-e) represent Lissajous curves obtained from oscillatory shear stress-strain test, performed on a rheometer, and FIG. 22 f-h) represent plots of the logarithm of the dissipated energies relative to the logarithm of the strain applied at −45° C. during an oscillatory shear stress-strain test, performed on a rheometer.

FIG. 23 a) shows atomic force microscopy (AFM) height images and b) differential scanning calorimetry measurements of the blend of M2 with unmodified polystyrene (9:1) and the blend M2/S2 9:1 (Example 11); c) shows atomic force microscopy (AFM) height images and d) differential scanning calorimetry measurements of the blend M3 with unmodified polystyrene (9:1) or the blend M3/S3 9:1 (Example 12).

FIG. 24 shows a) storage moduli G' and b) loss moduli G" determined by rheological dynamic frequency sweep experiments at 25° C. of M2, S2, the blend of M2 with unmodified polystyrene (9:1) and the blend M2/S2 9:1; c) shows storage moduli G' and d) loss moduli G" determined by rheological dynamic frequency sweep experiments at 25° C. of M3, S3, the blend of M3 with unmodified polystyrene (9:1) and the blend M3/S3 9:1.

FIG. 25 shows a rheological time-temperature superposition master curve of the ternary blend M3/S3/PIB (MW 35'000) 9:3:12 (Example 13).

DETAILED DESCRIPTION OF EXAMPLES

Figure 1:
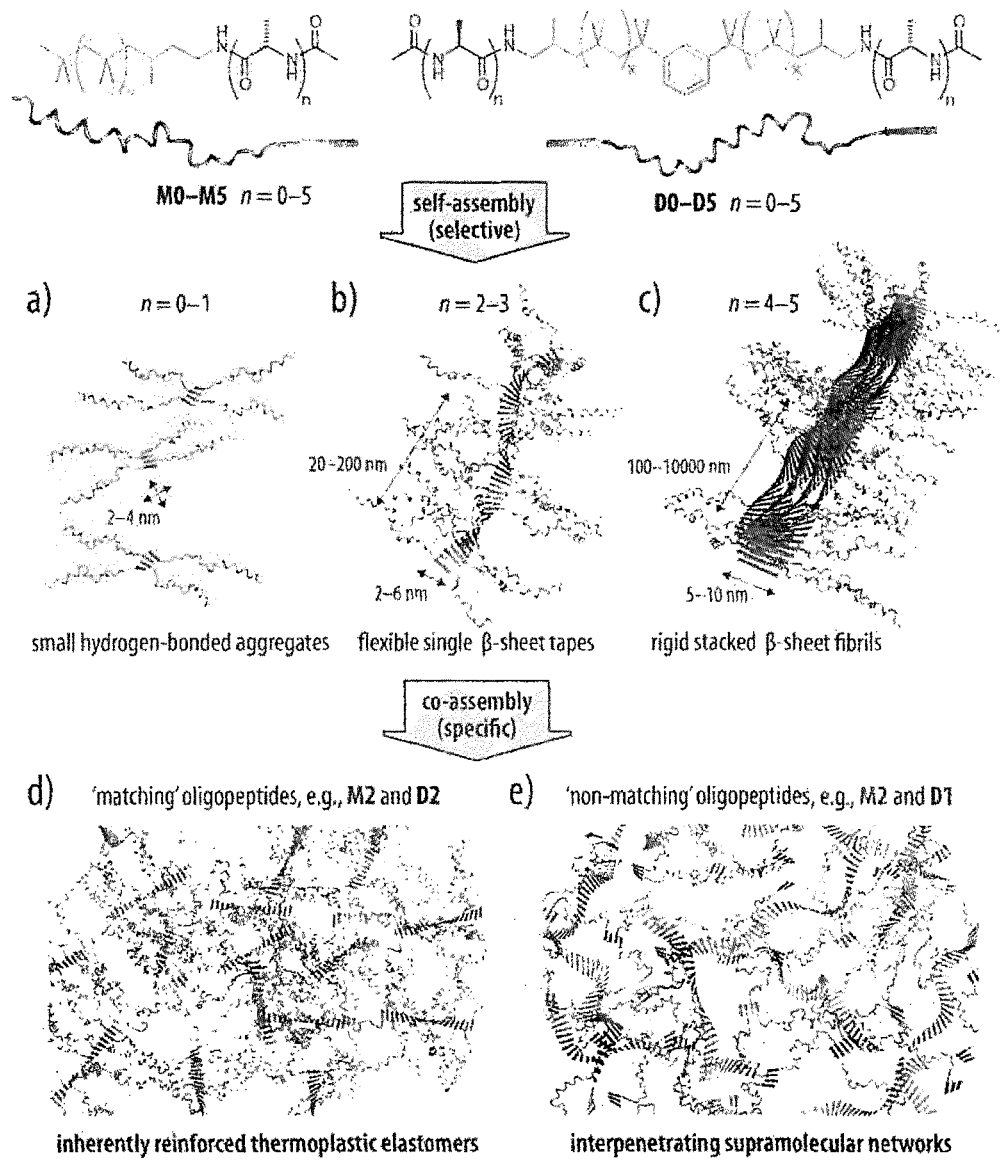
FIG. 1 $a$-$c$) represent schematic illustrations of the selective self-assembly of the monofunctional oligo (L-alanine)-modified poly(isobutylene)s M0-M5 (n=0-5; x≈20) and the corresponding difunctional derivatives D0-D5 (n=0-5; x≈20), FIG. 1 $d$) represents a schematic illustration in which the coexistence of these nanostructures in blends of molecules with matching oligopeptide termini results in 'inherently reinforced thermoplastic elastomers', and FIG. 1 $e$) represents a schematic illustration in which the coexistence of these nanostructures in blends of molecules with different oligopeptide termini results in 'interpenetrating supramolecular networks', FIG. 2 $a$-$d$) represent amide A and amide I regions of the solid-state infrared (IR) spectra of bulk samples of PIB-Ala$_n$-Ac M0-M5 as well as Ac-Ala$_n$-PIB-Ala$_n$-Ac D0-D5, as well as e-f) corresponding plots of the position of the global maxima of the amide A and amide I absorptions, FIG. 3 $a$-$d$) represent amide A and amide I regions of the solution-phase infrared (IR) spectra of samples of PIB-Ala$_n$-Ac M0-M5 as well as Ac-Ala$_n$-PIB-Ala$_n$-Ac D0-D5 in dilute solution in tetrachlorethane, as well as e-f) corresponding plots of the position of the global maxima of the amide A and amide I absorptions.

As shown in the drawings and referring in particular to FIG. 1:

FIG. 1 a-c) Schematic illustration of the selective self-assembly of the monofunctional oligo (L-alanine)-modified poly(isobutylene)s M0-M5 (n=0-5; x≈20) and the corresponding difunctional derivatives D0-D5 (n=0-5; x≈20) into small hydrogen-bonded aggregates, flexible single β-sheet tapes, or rigid stacked β-sheet fibrils. The coexistence of these nanostructures in blends of molecules with different oligopeptide termini resulted in d) 'inherently reinforced thermoplastic elastomers' or e) 'interpenetrating supramolecular networks'.

Differently from all previous examples of supramolecular networks, the aggregation of the oligopeptide-terminated polymers that constitute the basis of the present invention that comprise chiral and monodisperse (molecularly defined) oligopeptides as hydrogen-bonded ligands results in a highly selective formation of small hydrogen-bonded aggregates from compounds with short oligopeptides (such as M0-M1, D0-D1), flexible single β-sheet tapes from compounds with medium-size oligopeptides (such as M2-M3, D2-D3), or rigid stacked β-sheet fibrils from compounds with longer oligopeptides (such as M4-M5, D4-D5), because the helical conformation of single oligopeptide β-strands, the induced helical twisting of β-sheets, and finally the number of stacked β-sheets are intimately interrelated. This length-dependent self-assembly is even "self-sorting", that is, specific in the sense that the different nanostructures obtained from different oligopeptide segments coexist in bulk. It is this particular feature that has enabled us to tailor the thermomechanical properties of the blends. Thus, mixtures of molecules with "matching" oligopeptide termini (identical oligopeptide length and amino acid sequence) gave rise to thermoplastic elastomers that were "inherently reinforced" with β-sheet tapes or fibrils. By contrast, blends of derivatives with "non-matching" oligopeptide termini (different oligopeptide length or amino acid sequence, including non-functionalized polymers) formed novel "interpenetrating supramolecular networks". It is worth noting that in both cases, network formation allows for dynamic network reorganization processes and may give rise to self-healing or thermoresponsive materials. In this regard, polyisobutylene soft segments have proven to be of high interest, due to their conformational dynamics and resulting macroscopic properties. See in particular the manifold examples. Further examples of blends of non-functionalised and oligopeptide-terminated derivatives of flexible and hydrophobic polymers, such as polyisoprene, polybutadiene, polyacrylates, polysiloxanes, or fluoropolymers, share the same structural features and properties and are embraced by the current invention.

Figure 2:
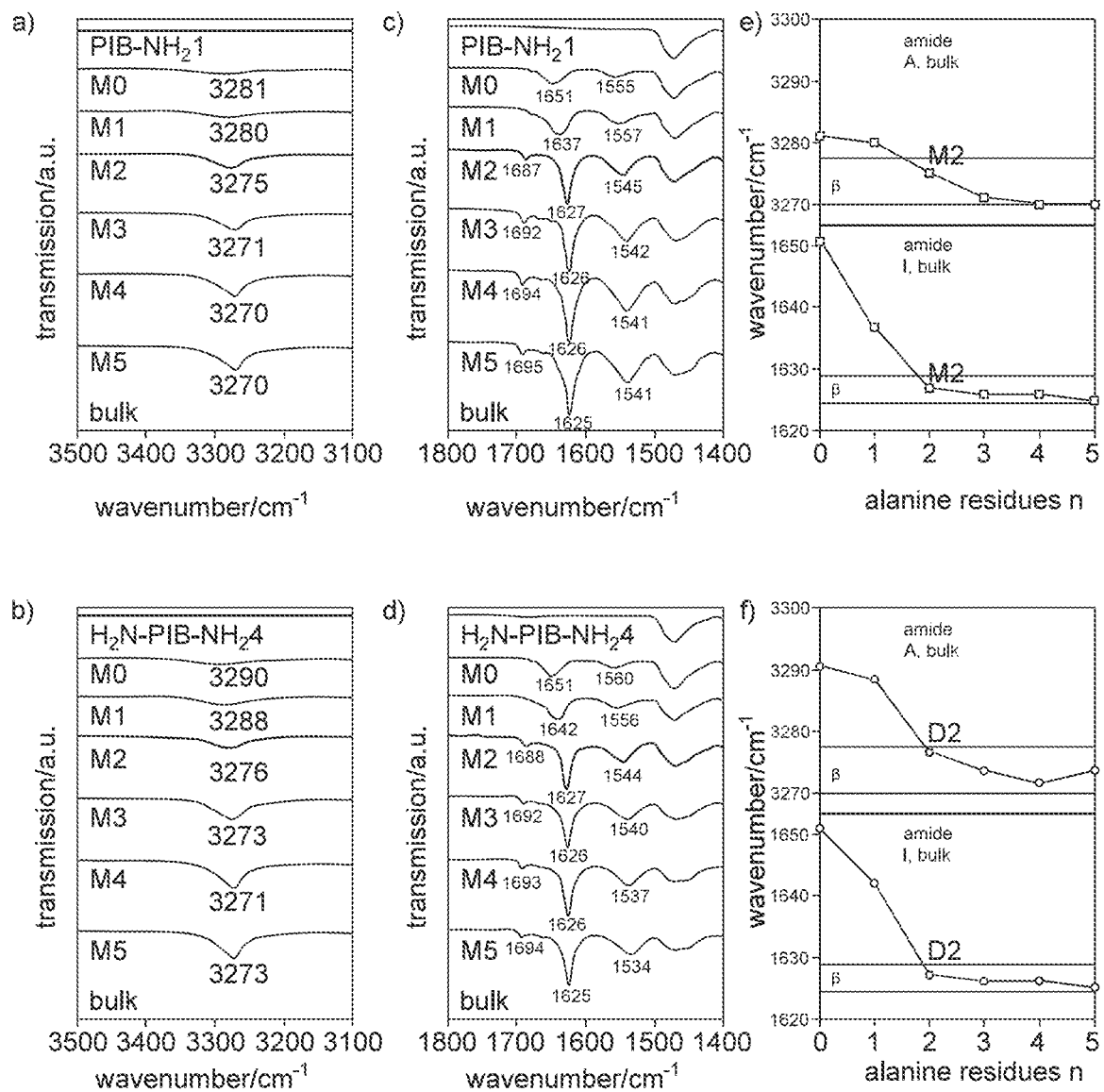

Referring in Particular to FIGS. 2-5:

FIG. 2. a-d) Amide A and amide I regions of the solid-state infrared (IR) spectra of bulk samples of PIB-$Ala_n$-Ac M0-M5 as well as Ac-$Ala_n$-PIB-$Ala_n$-Ac D0-D5, as well as e-f) corresponding plots of the position of the global maxima of the amide A and amide I absorptions as a function of the number of alanine repeating units n revealed that M2-M5 and D2-D5 exhibited a single amide A absorption at 3270-3276 $cm^{-1}$, a strong and sharp amide I absorption at 1625-1627 $cm^{-1}$ (half-height width≈16-17 $cm^{-1}$), and a sharp secondary absorption at 1687-1695 $cm^{-1}$, all consistent with the presence of highly ordered antiparallel β-sheet structures. See FIG. 4 for peak deconvolutions.

Figure 3:
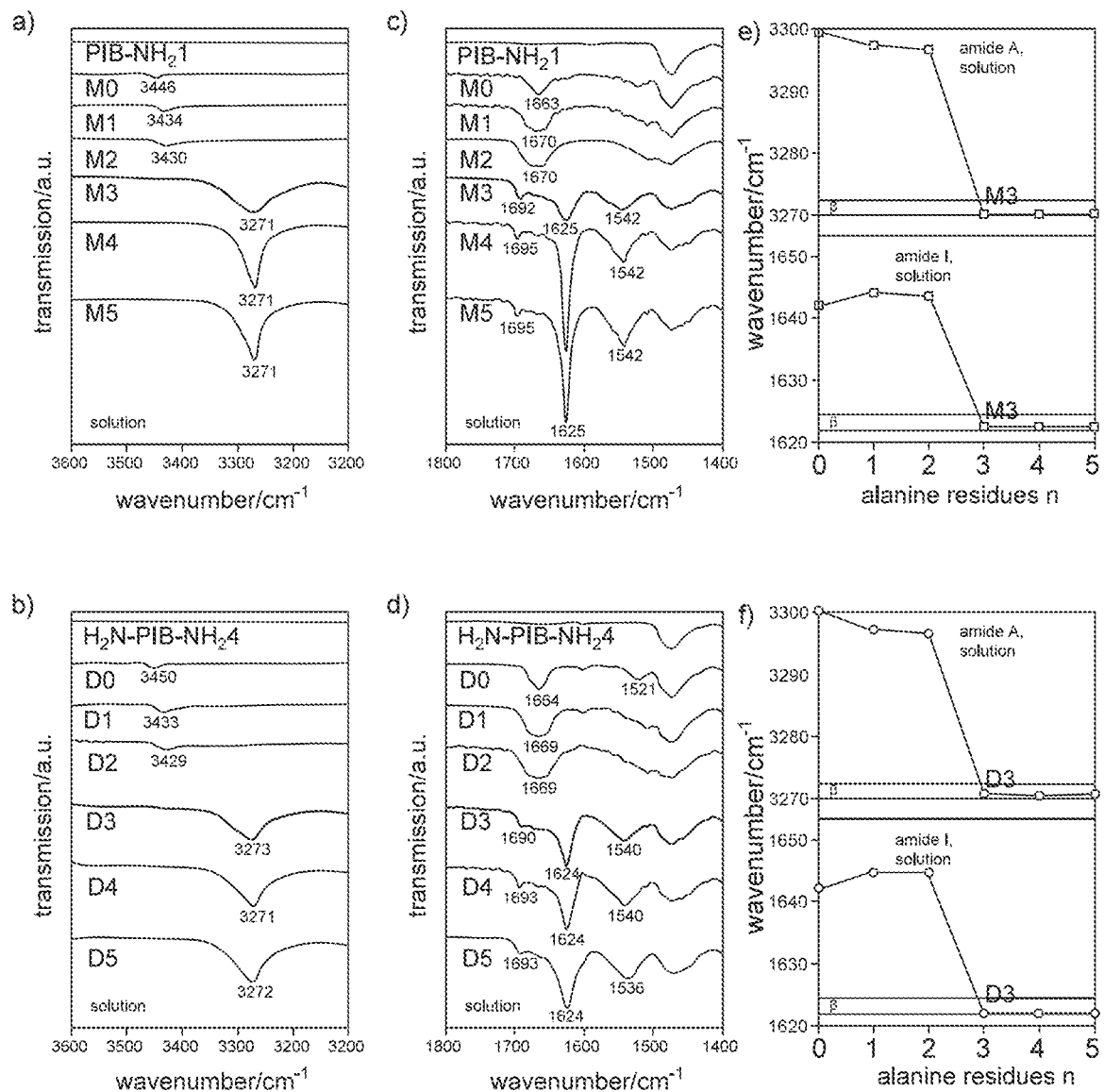

FIG. 3. a-d) Amide A and amide I regions of the solution-phase infrared (IR) spectra of samples of PIB-Ala$_n$-Ac M0-M5 as well as Ac-Ala$_n$-PIB-Ala$_n$-Ac D0-D5 in dilute solution in tetrachlorethane, as well as e-f) corresponding plots of the position of the global maxima of the amide A and amide I absorptions as a function of the number of alanine repeating units n revealed that, in solution, M0-M2 and D0-D2 remained non-aggregated. A sharp transition was then observed for longer oligopeptides; M3-M5 as well as D3-D5 exhibited a single amide A absorption at 3271-3273 cm-1, a strong and sharp amide I absorption at 1624-1625 cm-1 (half-height width≈14-17 cm-1), and a sharp secondary absorption at 1690-1695 cm-1, all consistent with the presence of highly ordered antiparallel β-sheet structures in solution. See FIG. 4 for peak deconvolutions.

Figure 4:
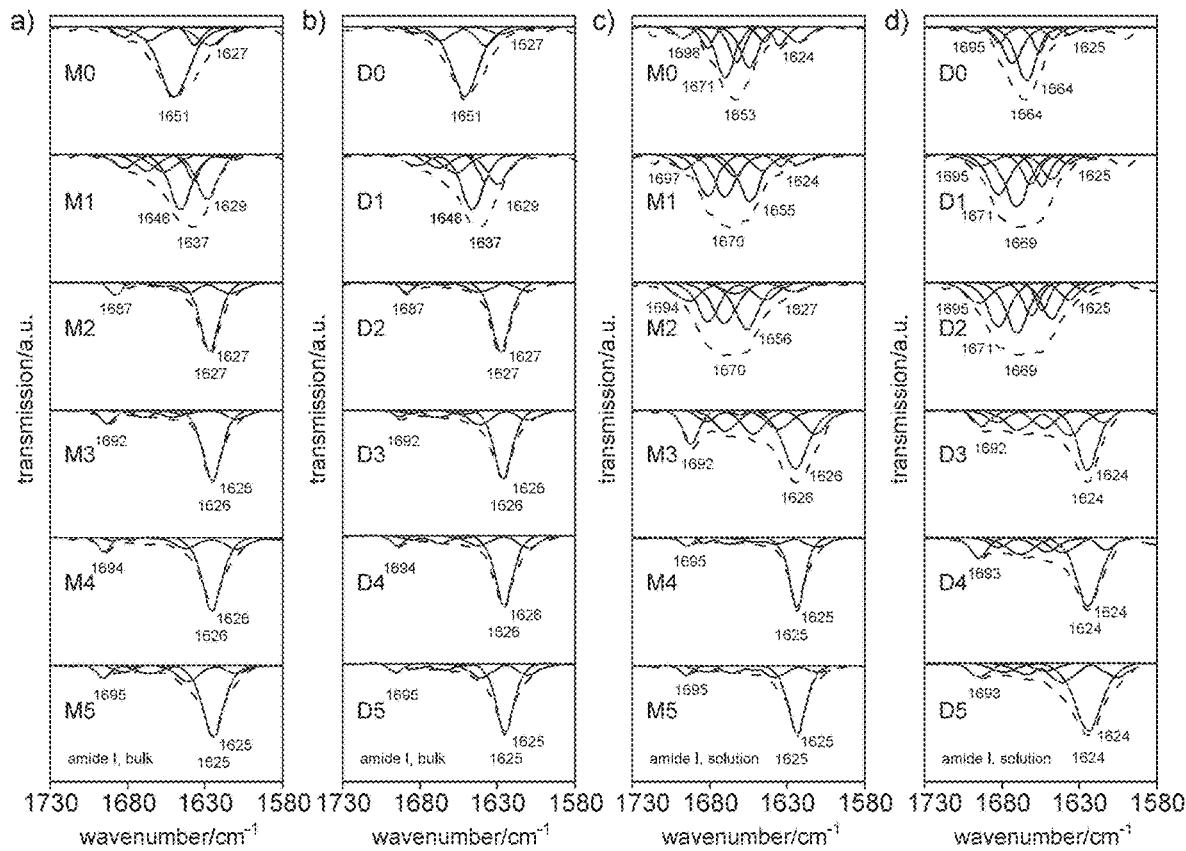
FIG. 4 represents peak deconvolution of the amide I regions of samples of PIB-Ala$_n$-Ac M0-M5 as well as Ac-Ala$_n$-PIB-Ala$_n$-Ac D0-D5 a-b) in bulk or c-d) in dilute solution in tetrachlorethane.

FIG. 4 Peak deconvolution of the amide I regions of samples of PIB-Ala$_n$-Ac M0-M5 as well as Ac-Ala$_n$-PIB-Ala$_n$-Ac D0-D5 a-b) in bulk or c-d) in dilute solution in tetrachlorethane; global maxima labelled in blue; β-sheet bands in red; predominant bands in black. Although the peak fitting was started with the same number of bands at approximately the same positions, limiting their width to reasonable values in all cases, the results of the deconvolution were still sensitive to the exact starting parameters and, therefore, just served to obtain an estimate for the peak area A1625 of the absorption bands at around 1625-1630 cm$^{-1}$ relative to the total peak area AI, total of the amide I absorption. The latter is a qualitative assessment for the relative degree of aggregation. See FIG. 2d (main text) for a plot of A1625/AI, total as a function of the number of alanine repeating units n.

Figure 5:
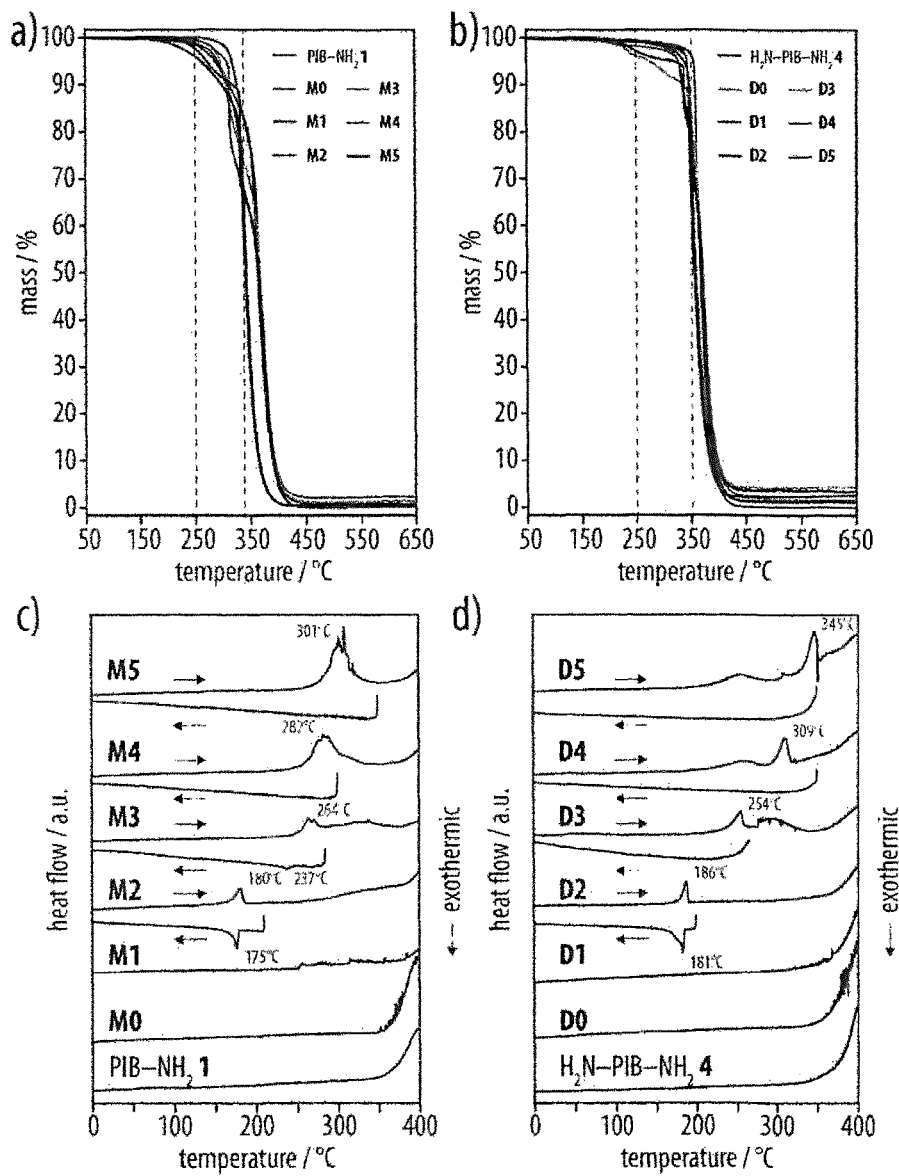
FIG. 5 shows atomic force microscopy (AFM) images of M1-M5 spin-coated from tetrachlorethane solution onto either $SiO_2$ or HOPG substrates, FIG. 6 $a$-$b$) show thermogravimetric analysis of M0-M5 and D0-D5 as well as the parent poly(isobutylene)s PIB—$NH_2$ and $H_2N$—PIB—$NH_2$, FIG. $c$) represents differential scanning calorimetry of M0-M5 as well as the parent poly(isobutylene) PIB-$NH_2$, and FIG. $d$) represents differential scanning calorimetry of D0-D5 as well as the parent poly(isobutylene) $H_2N$-PIB-$NH_2$, FIG. 7 $a$-$b$) represent amide I regions of the temperature-dependent solid-state IR spectra of M2 and D2, FIG. 8 $a$-$c$) show rheological dynamic frequency sweep experiments at 25° C. of unmodified PIB of different molecular weights (1200 for PIB—$NH_2$, 2500 for $H_2N$—PIB—$NH_2$, 35'000, 75'000, 200'000, 425'000), showing a) storage moduli G', b) loss moduli G", and c) viscosity 2 and D2, FIG. 9 $a$-$f$) show rheological dynamic frequency sweep experiments at 25° C. of PIB-Ala$_n$-Ac M0-M5 and Ac-Ala$_n$-PIB-Ala$_n$-Ac D0-D5 as well as the parent poly(isobutylene)s 1 and 4, showing a,d) storage moduli G', b, e) loss moduli G", and c,f) viscosity, FIG. 10 $a$-$c$) show rheological dynamic frequency sweep experiments at 25° C. of different binary blends M2/D2, showing a) storage moduli G', b) loss moduli G", and c) and viscosity.

FIG. 5. Atomic force microscopy (AFM) images of M1-M5 spin-coated from tetrachlorethane solution onto either SiO$_2$ or HOPG substrates revealed the formation of fibrils for M5; mixtures of fibrils and tapes for M4 on HOPG and mixtures of fibrils and drop-like features on SiO$_2$; no defined aggregates for M0-M3 on SiO$_2$, but long tapes for M3, short laterally aggregated tapes for M2, and continuous films for M1 and M0 on HOPG.

The monofunctional compounds M0-M5 and the difunctional compounds D0-D5 exhibited distinctly length-dependent aggregation properties. According to IR spectroscopy, M4-M5 and D4-D5 gave rise to highly ordered and strongly aggregated antiparallel β-sheet structures both in bulk and in solution. M2-M3 and D2-D3 were only aggregated in bulk materials. The end groups in M0-M1 and D0-D1 were too short to induce β-sheet formation either in the bulk or in solution. Atomic force microscopy (AFM) imaging then established a link to the corresponding nanoscopic morphologies for the monofunctional derivatives M0-M5. Thus, rigid and many micrometres long fibrils with diameters of a few nanometres were observed for M5 and M4 on both highly oriented pyrolytic graphite (HOPG) and SiO$_2$ substrates. The dimensions of fibrils obtained from M5 suggested that they were formed from 4-6 stacked β-sheet tapes. In the case of M4, the fibrils were formed from 2-4 stacked β-sheet tapes, according to their cross-sections determined by AFM imaging. M3 gave rise to long flexible fibrils or tapes on HOPG that were thinner than those of M4 and exhibited an epitaxial orientation with the substrate. In the case of M2, we observed laterally aggregated tape-like features on HOPG with lengths on the order of a few hundred nanometres. The epitaxial orientation of the tape-like features from M2-M4 on HOPG as well as their absence on SiO$_2$ substrates suggested that they had not already been present in solution but formed upon drying of the sample on the AFM substrate, in agreement with the IR spectroscopic results. Hence, our results prove that longer oligopeptides did not only result in the expected increase in aggregation strength but that superstructure formation was also affected, due to the molecular chirality of an oligo (L-alanine) segment. We proved that we selectively obtained rigid stacked β-sheet fibrils from the "longest" oligopeptides (n≥4 alanine residues); single β-sheet tapes from "medium-size" oligopeptides (n=2-3 alanine residues) in the bulk; and weak, undefined aggregates from short hydrogen-bonded end groups (n=0-1 alanine residues).

Figure 6:
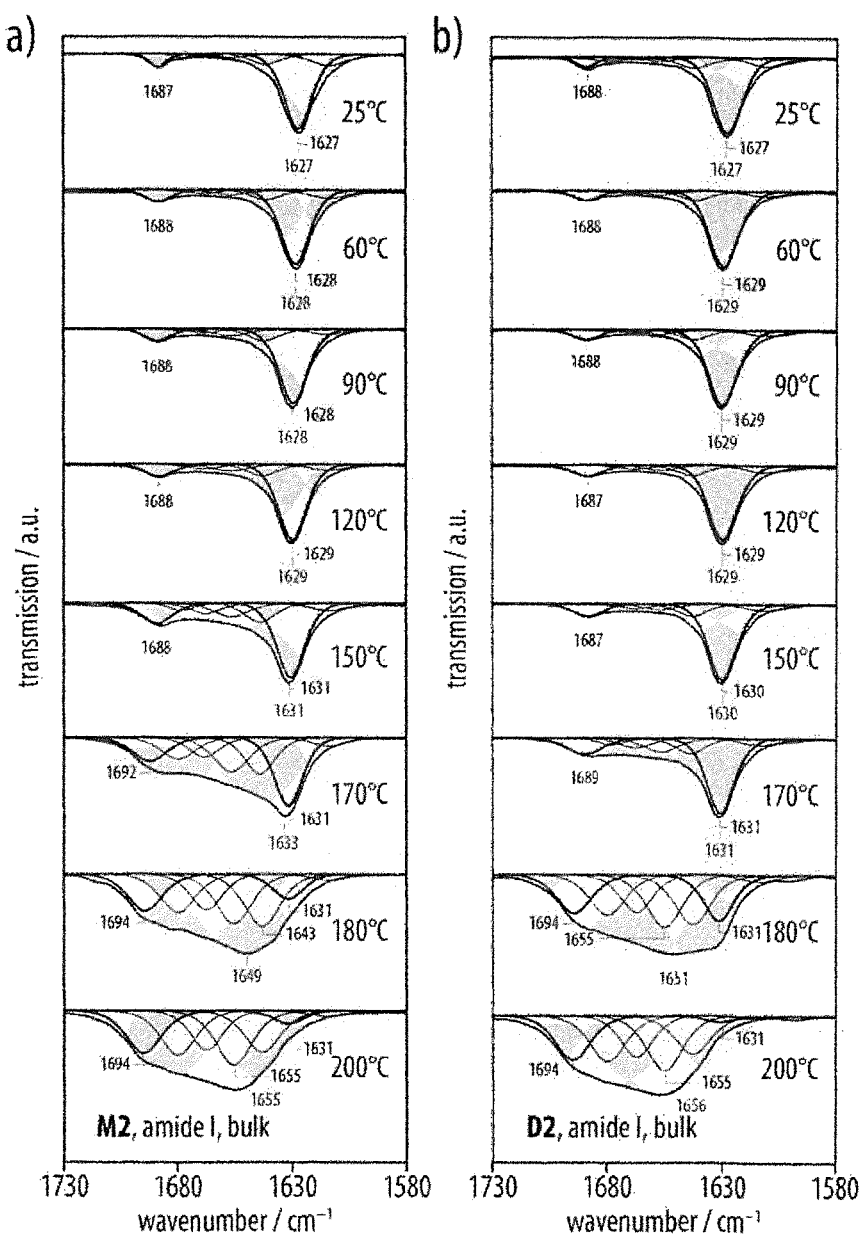
Figure 7:
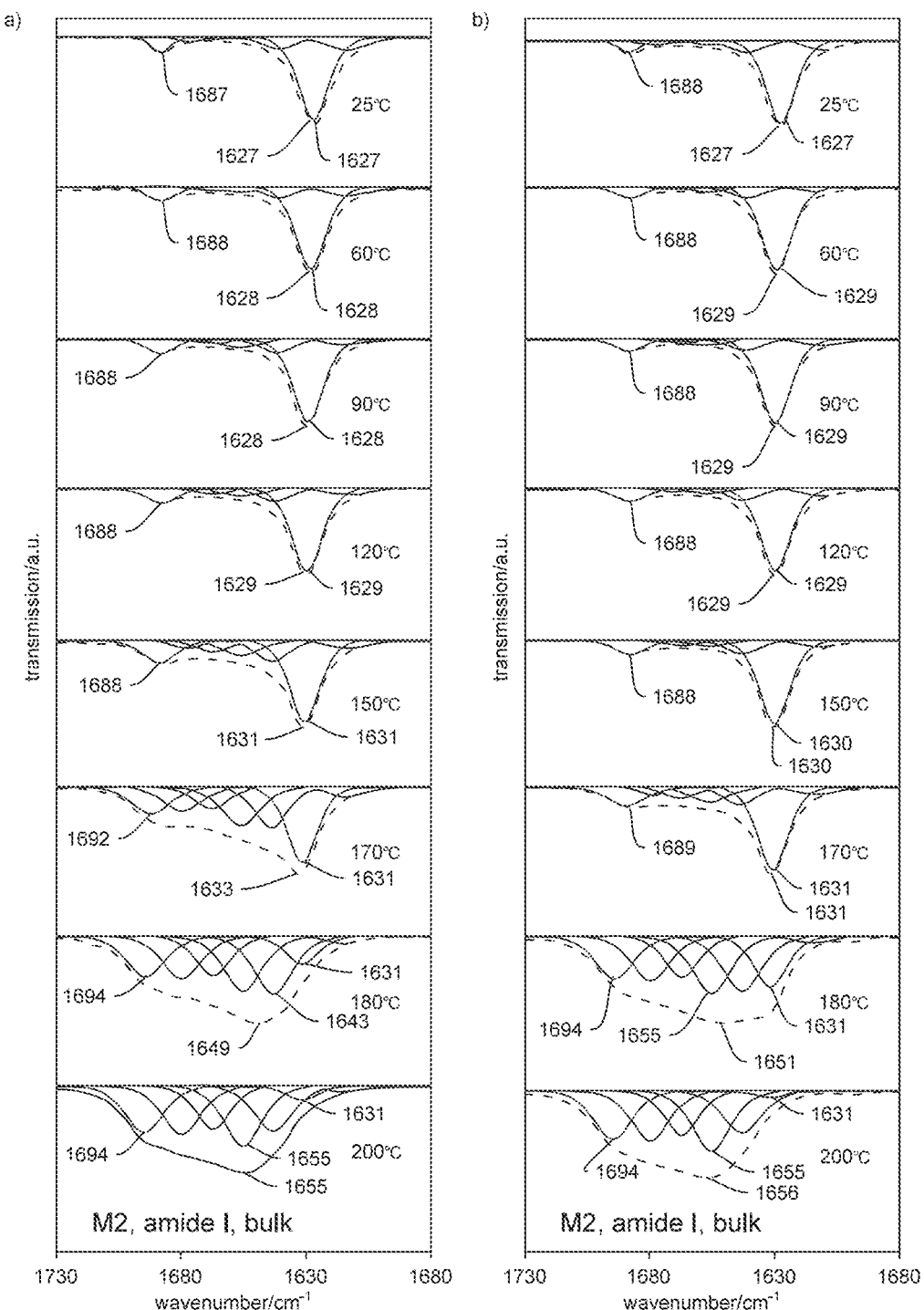

Referring in Particular to FIGS. 6-7:

FIG. 6 a-b) Thermogravimetric analysis of M0-M5 and D0-D5 as well as the parent poly(isobutylene)s PIB—NH$_2$ and H$_2$N—PIB—NH$_2$ revealed that complete PIB depolymerization occurred at temperatures above 340° C. in all cases. Whereas derivatives M0-M2 and D0-D2 were stable up to temperatures of at least 250° C., compounds with longer oligopeptides noticeably underwent a first stage of decomposition already at temperatures of around 170-200° C., tentatively assigned to a degradation of the oligopeptides, supposedly by ring-closing fragmentation. c-d) Differential scanning calorimetry revealed that only M2 and D2 exhibited reversible thermal transitions at 170° C. (15.5 J/g) and 178° C. (16 J/g), respectively. These could be assigned to the 'melting' (deaggregation) and 'crystallization' (aggregation) of the β-sheet aggregates (see FIG. 7). Derivatives with longer oligopeptides showed endothermic peaks at increasingly high temperatures that were already in the range of or above their decomposition temperatures and, accordingly, did not exhibit any exothermic peaks upon cooling, except for M3 which exhibited a weak exothermic peak at 238° C. (3 J/g).

FIG. 7 a-b) Amide I regions of the temperature-dependent solid-state IR spectra of M2 and D2 revealed that the position and intensity of the absorption bands associated with β-sheet secondary structures remained virtually unchanged until at least 150° C. but then rapidly decreased at temperatures above 170° C., proving that the reversible transitions observed in DSC (see FIG. 6) were associated to 'melting' (deaggregation) and 'crystallization' (aggregation) of the β-sheet aggregates.

Thermogravimetric analysis (TGA), differential scanning calorimetry (DSC), and temperature-dependent solid-state IR spectroscopy proved that M0-M2 and D0-D2 were straightforwardly processable below their degradation temperature of 250° C. Moreover, M2 and D2 exhibited detectable reversible thermal transitions at 170° C. and 178° C., respectively, according to DSC, that solid state IR spectroscopy proved to be associated with β-sheet deaggregation.

Figure 8:
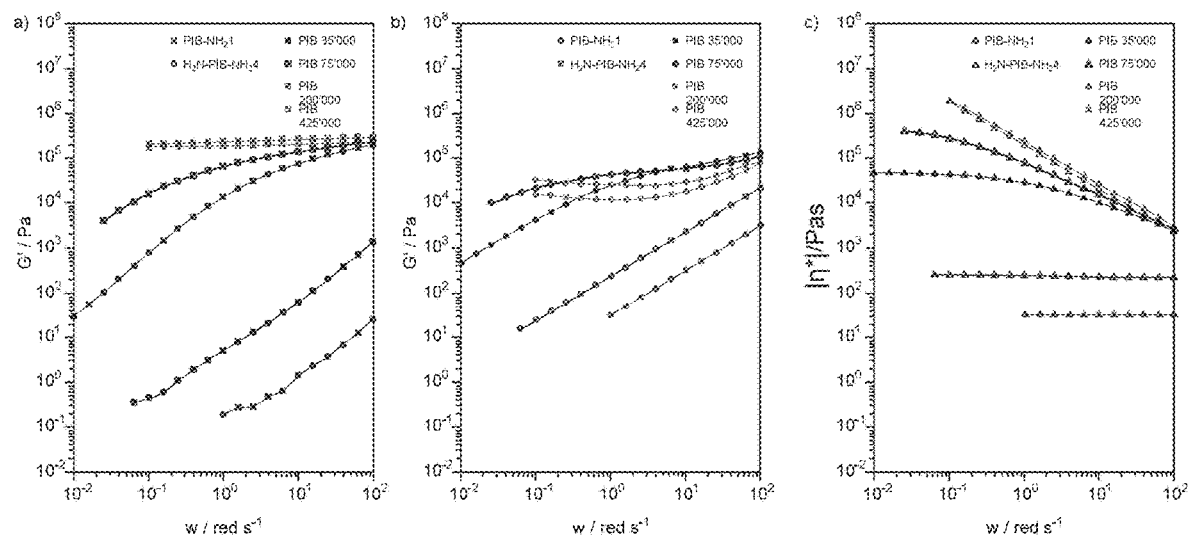
Figure 9:
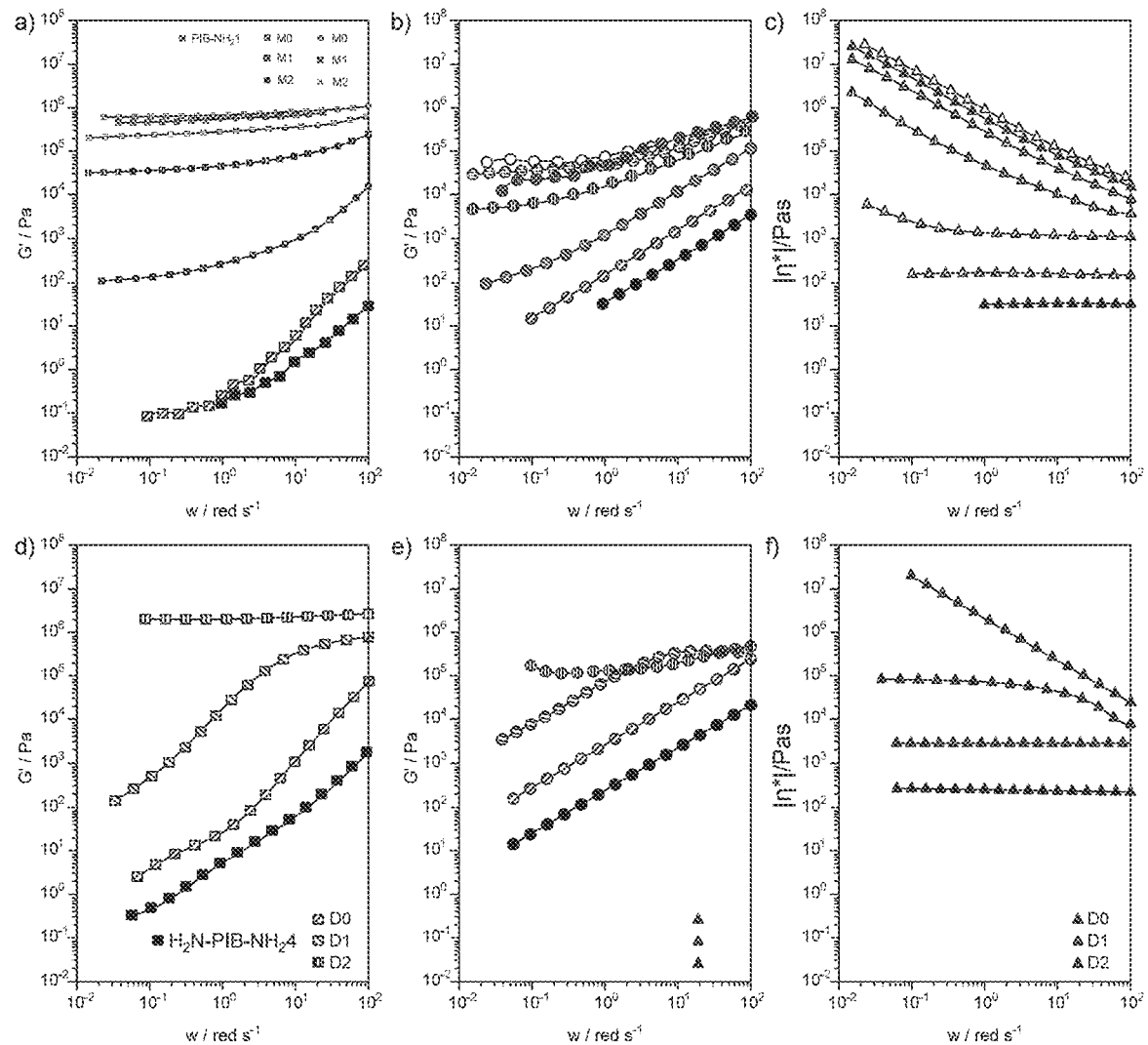

Referring in Particular to FIGS. 8-9:

FIG. 8 a-c) Rheological dynamic frequency sweep experiments at 25° C. of unmodified PIB of different molecular weights (1200 for PIB—NH$_2$, 2500 for H$_2$N—PIB—NH$_2$, 35'000, 75'000, 200'000, 425'000), showing a) storage moduli G', b) loss moduli G", and c) viscosity |η*|; the shear viscosity formally defined as |η*|=p$_{21,0}$/(γ$_0$·ω) was used as a calculated entity to compare both liquid and rubbery materials. The γ (% strain) values used for these experiments ranged from 3-30% and were selected to be in the linear regime of the investigated materials. Depending on their molecular weight, the materials undergo a transition in mechanical properties, from low viscosity liquid behaviour with a zero-shear viscosity of 32 Pa s for PIB—NH$_2$ and 140 Pa s for H$_2$N—PIB—NH$_2$ to, finally, rubbery behaviour for PIB (MW 200'000 and 425'000). Hence, the latter two materials exhibited a frequency-dependent viscosity |η*| with a slope of −1, and both their storage (G') and loss moduli (G") at 1 rad/s (as a reference) were increased by 7 and 3 orders of magnitude, respectively, as compared to low molecular weight PIB—$NH_2$.

FIG. 9 a-f) Rheological dynamic frequency sweep experiments at 25° C. of PIB-Ala$_n$-Ac M0-M5 and Ac-Ala$_n$-PIB-Ala$_n$-Ac D0-D5 as well as the parent poly(isobutylene)s 1 and 4, showing a,d) storage moduli G', b,e) loss moduli G", and c,f) viscosity |η*|; the shear viscosity formally defined as |η*|=p$_{21,0}$/(γ$_0$·ω) was used as a calculated entity to compare both liquid and rubbery materials. The γ (% strain) values used for these experiments ranged from 0.03-30% and were selected to be in the linear regime of the investigated materials. Depending on the number of hydrogen-bonding sites in the series M0-M5, the materials showed a transition from moderately viscous liquid behaviour to a rubbery behaviour for M3-M5. The latter materials exhibited a frequency-dependent viscosity |η*| with a slope of −1 and both their storage (G') and loss moduli (G") at 1 rad/s (as a reference) were increased by 7 and 3 orders of magnitude, respectively, as compared to the constituent low molecular weight PIB—$NH_2$ 1. Difunctional derivatives D0-D2 can give rise to supramolecular networks and, hence, showed an even more drastic transition of mechanical properties. Thus, D2 was already brittle hard solid and exhibited a storage modulus of G'=2 MPa, 10 times higher than high molecular weight poly(isobutylene) (MW≥200'000). The pure higher difunctional homologues D3-D5 were hard and brittle powders that could not be processed into solid discs and, hence, were not investigated by means of shear rheology.

Shear rheology on the monofunctional derivatives M0-M5 in comparison to unmodified polyisobutylenes revealed a transition of mechanical properties from moderately viscous liquid (M0-M1) to a rubbery behaviour (M4-M5) as a function of the number of n alanine residues. Starting with the β-sheet tape-forming derivatives M2-M3, the materials exhibited shear moduli exceeding those of high molecular weight polyisobutylenes, although the molecular weight of the attached polymer (MW 1,200) was far below the entanglement length of PIB (45,000) and the monofunctional derivatives cannot form hydrogen-bonded networks. The storage and loss moduli at 1 rad/s within the series levelled off towards G'≈0.6 MPa and G"≈0.06 MPa, indicating that a further increase of the oligopeptide length would not substantially affect the materials' mechanical properties anymore. The network-forming difunctional derivatives D0-D2 showed even more drastic changes in mechanical properties as a function of oligopeptide length, and D2 was already a brittle hard solid (G'=2 MPa). While the notion of a mechanical reinforcement is certainly well in line with previous examples of supramolecular networks, the observed drastic dependence of aggregation behaviour and mechanical properties on the number of hydrogen-bonding sites allows for further tailoring of the materials' thermomechanical properties in blends of the investigated compounds. See in particular the disclosed examples.

Figure 10:
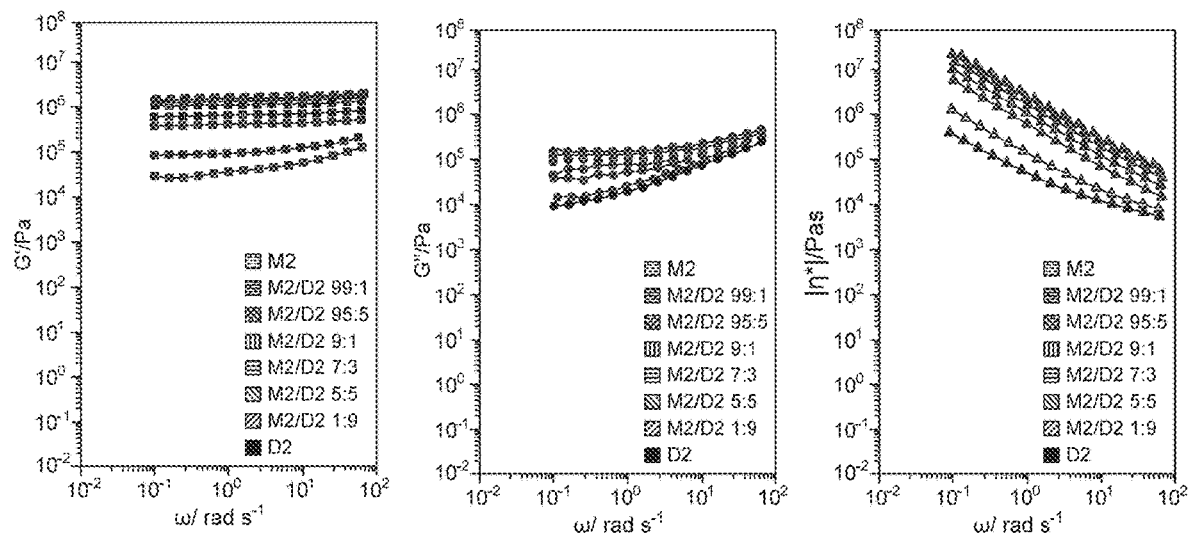

Referring in Particular to FIGS. 10-14 (Examples 1-6):

FIG. 10 a-c) Rheological dynamic frequency sweep experiments at 25° C. of different binary blends M2/D2, showing a) storage moduli G', b) loss moduli G", and c) and viscosity |η*|; the shear viscosity formally defined as |η*|=p$_{21,0}$/(γ$_0$·ω) was used as a calculated entity to compare both liquid and rubbery materials. The γ (% strain) values used for these experiments ranged from 0.05-0.5% and were selected to be in the linear regime of the investigated materials. Large changes in the moduli and viscosities were observed between pure M2 and blends of up to 10 wt % of D2 in M2, which then level off for compounds with higher content of D2.

Figure 11:
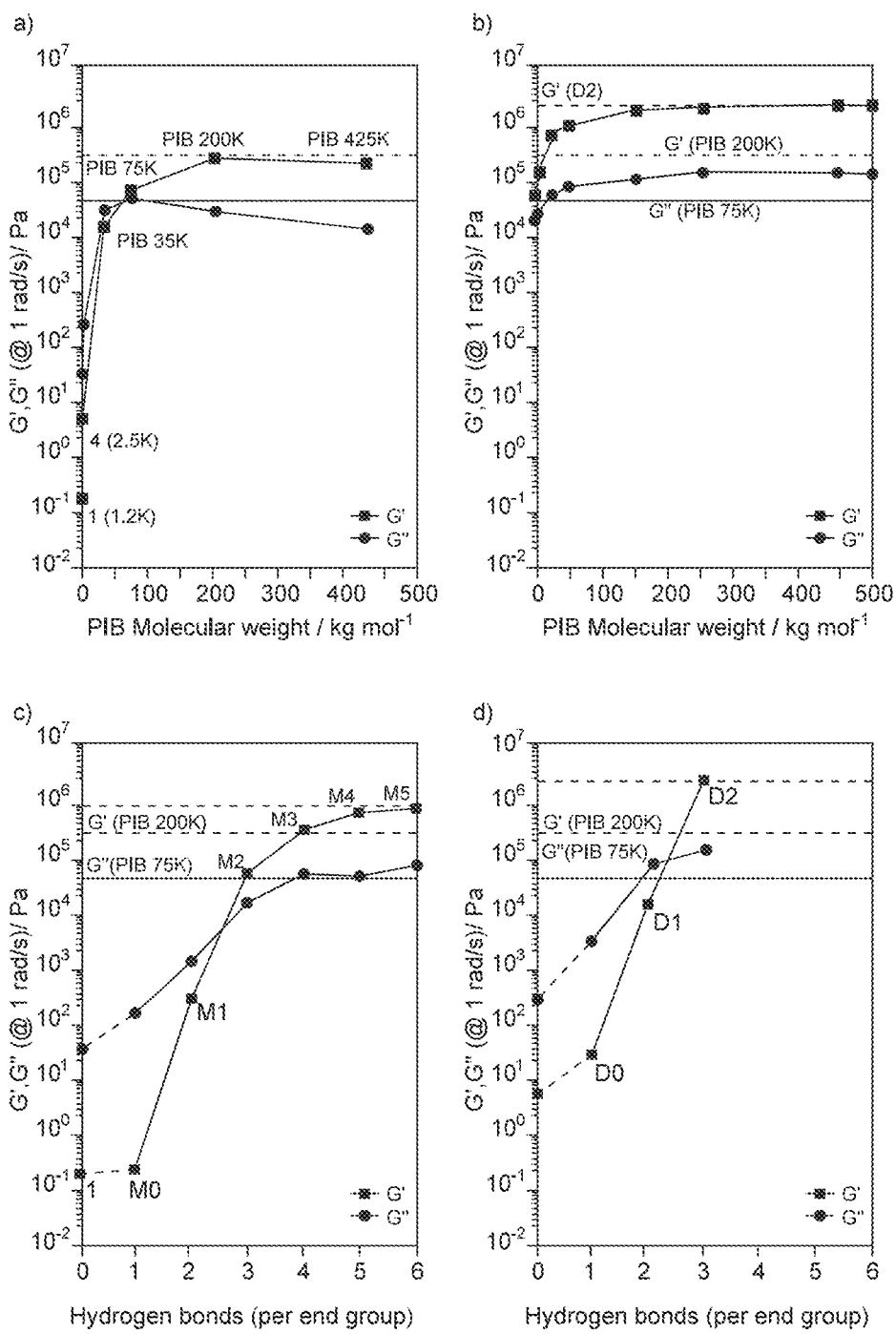
FIG. 11 shows a comparison of storage (G') and loss moduli (G") at 1 rad/s of a) unmodified PIB as a function of molecular weight, c,d) M0-M5 and D0-D2 as a function of hydrogen-bonding sites per end group, and b) of different blends of M2/D2 as a function of composition.

FIG. 11 Comparison of storage (G') and loss moduli (G") at 1 rad/s of a) unmodified PIB as a function of molecular weight, c,d) M0-M5 and D0-D2 as a function of hydrogen-bonding sites per end group, and b) of different blends of M2/D2 as a function of composition. Storage moduli of M3-M5 and D2 as well as blends of at least 5% D2 in M2 (G'=0.6 MPa) exceed those of high molecular weight PIB. Blends M2/D2 with more than 10 wt % of D2 show storage and loss moduli levelling off toward G'≈2 MPa and G"≈0.1 MPa as observed for pure D2. In the series of M0-M5, the storage and loss moduli appear to converge toward G'≈0.6 MPa and G"≈0.06 MPa.

Figure 12:
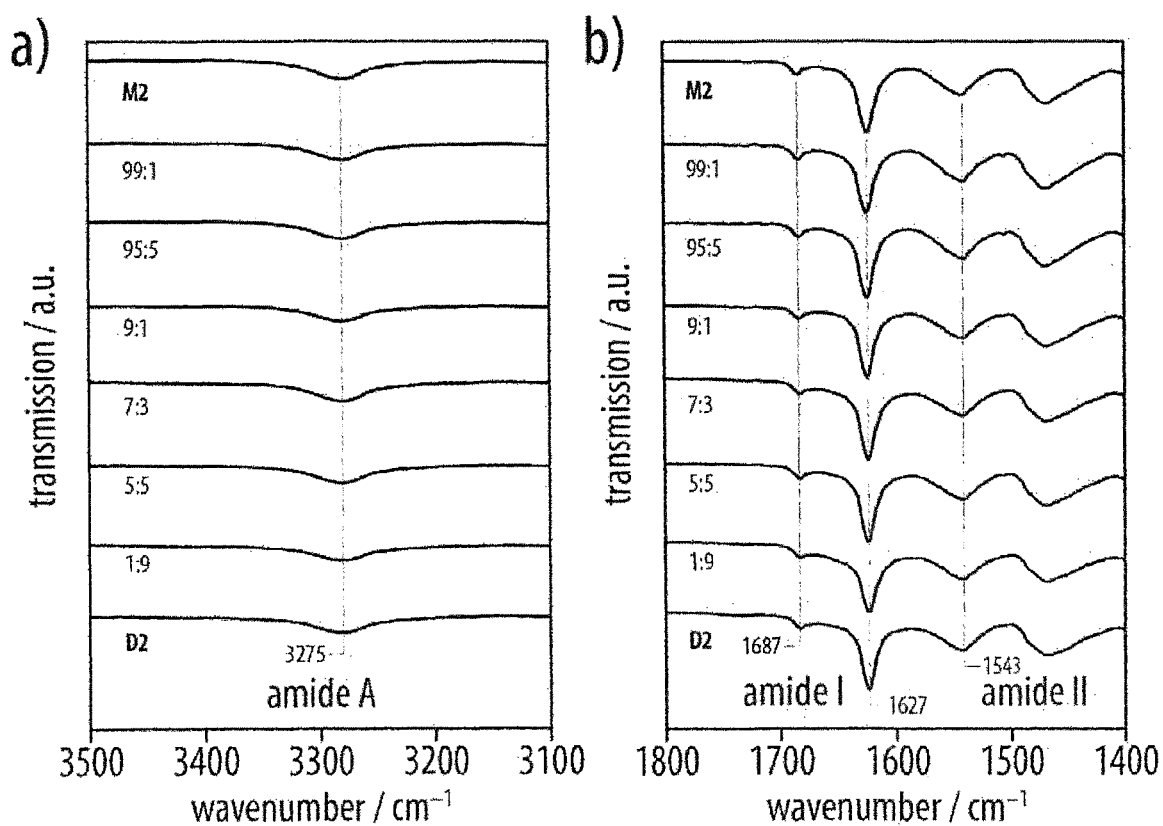
FIG. 12 represents amide A, amide I and amide II regions of the solid-state infrared (IR) spectra of M2, D2, as well as the complete series of M2/D2 blends (Examples 1-6), FIG. 13 $a$-$b$) represent amide I regions of the temperature-dependent solid-state IR spectra of the blend M2/D2 9:1 (Example 3), and c) whereas the parent PIB amine was a viscous liquid, M2 was a sticky solid, D2 a brittle powder, the blend M2/D2 9:1 (Example 3) was an 'inherently reinforced' thermoplastic elastomer.

FIG. 12 Amide A, amide I and amide II regions of the solid-state infrared (IR) spectra of M2, D2, as well as the complete series of M2/D2 blends (Examples 1-6). They all exhibited a single amide A absorption at 3275 cm$^{-1}$, a strong and sharp amide I absorption at 1627 cm$^{-1}$, a smaller absorption at 1687 cm$^{-1}$ and an amide II absorption at 1543 cm$^{-1}$, consistent with the presence of highly ordered anti-parallel β-sheet structures. Moreover, independent of their composition, the blends exhibited and amide I regions indistinguishable from the pure compounds, providing evidence for the presence of antiparallel β-sheet structures and the miscibility of D2 in M2.

Figure 13:
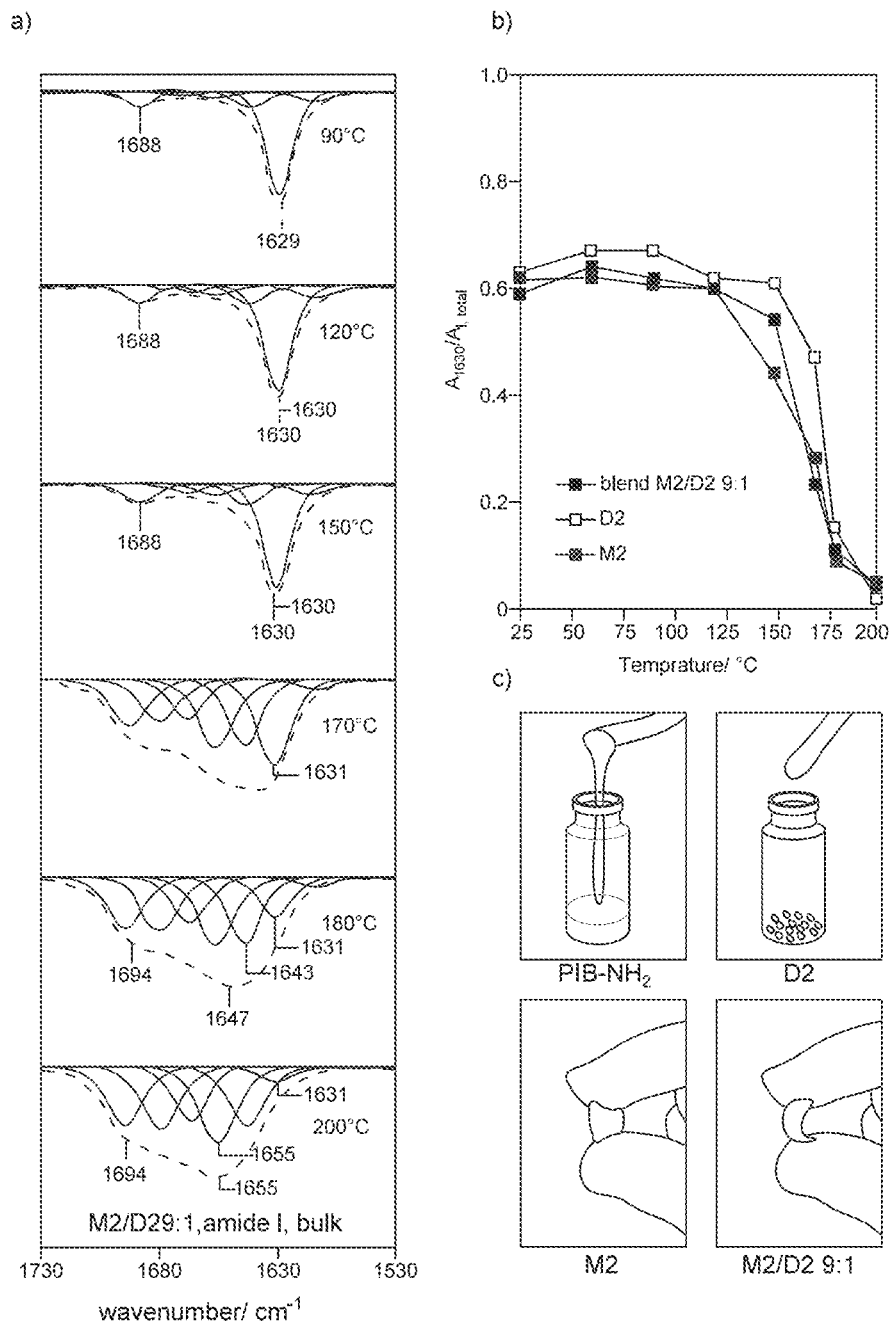

FIG. 13 a-b) Amide I regions of the temperature-dependent solid-state IR spectra of the blend M2/D2 9:1 (Example 3) revealed that the position and intensity of the absorption bands associated with β-sheet secondary structures remained virtually unchanged until at least 150° C. but then rapidly decreased at temperatures above 170° C., exactly like the individual components M2 and D2. This proves that the thermal transitions were associated to 'melting' (de-aggregation) and 'crystallization' (aggregation) of the β-sheet aggregates and that the two compounds formed a common hydrogen-bonded network together. c) Whereas the parent PIB amine was a viscous liquid, M2 was a sticky solid, D2 a brittle powder, the blend M2/D2 9:1 (Example 3) was an 'inherently reinforced' thermoplastic elastomer.

Figure 14:
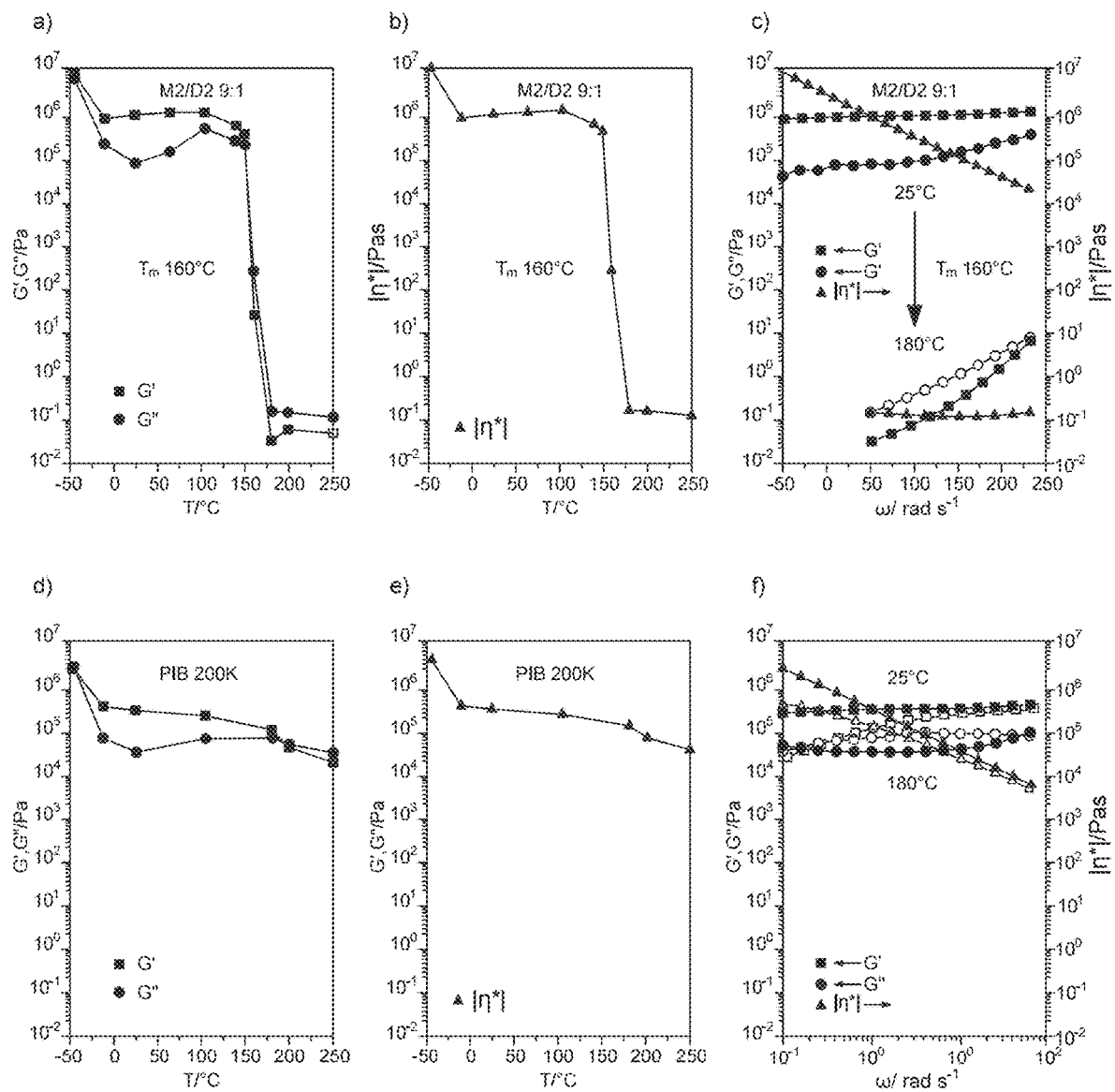
FIG. 14 shows temperature-dependent shear rheology of a-c) the blend M2/D2 9:1 (Example 3) and d-f) PIB (MW 200'000) as a reference material, FIG. 15 a-c) show Temperature-dependent shear rheology of the blend M2/D1 1:4 (Example 7), compared to pure M2, pure D1, as well as the blend M2/D2 9:1 (Example 3) including plots of a) storage modulus G', b) loss modulus G", and c) viscosity, and FIG. 15 d) represents differential scanning calorimetry of M2/D1 1:4, FIG. 16 a-c) show rheological time-temperature superposition (TTS) master curves of D1, M2, and M2/D1 1:4 (Example 7)

FIG. 14 Temperature-dependent shear rheology of a-c) the blend M2/D2 9:1 (Example 3) and d-e) PIB (MW 200'000) as a reference material. Plots of storage modulus G', loss modulus G", and viscosity |η*| (formally defined as |η*|=p$_{21,0}$/(γ$_0$·ω) and used as a calculated entity to compare both liquid and rubbery materials) at 1 rad/s as a function of temperature and examples of rheological dynamic frequency sweep experiments at 25° C. and 180° C. showed that M2/D2 9:1 (Example 3) experienced a sharp and single-step decrease of its moduli and viscosity at a temperature of about 160° C., yielding low viscosity liquids, that had been found to coincide with β-sheet deaggregation according to temperature-dependent IR spectroscopy (see FIG. 13a). By contrast, PIB (MW 200'000) remained in the rubbery state up to temperatures of at least 250° C. The γ (% strain) values used for these experiments ranged from 0.1-50% and were selected to be in the linear regime of the investigated materials.

Binary blends of monofunctional and difunctional derivatives with "matching" oligopeptide segments were found to give rise to supramolecular networks that were "inherently reinforced" by the incorporated β-sheet aggregates. Specifically, binary blends of the thermally processable compounds M2 and D2 with the compositions (by weight) M2/D2 99:1 (Example 1), 95:5 (Example 2), 9:1 (Example 3), 7:3 (Example 4), 5:5 (Example 5), and 1:9 (Example 6) were obtained by dissolving mixtures of the compounds in tetrachlorethane (TCE), stirring the solutions at room temperature for 16 h, removing the solvent in vacuo, and drying the resulting materials in high vacuum at 120° C. for 3 days. Independent of their composition, the blends exhibited solid state IR spectra with amide I regions indistinguishable from the pure compounds and underwent a single-step "melting" transition at 160-170° C. associated with the deaggregation of all β-sheet structures. The blends yielded rubbery materials with shear moduli that exceeded those of even high molecular weight PIB (0.2 MPa) by an order of magnitude even for low fractions of D2. Thus, the storage moduli already reached G'=0.6 MPa upon the addition of ≥5 wt % D2 (Examples 2-6) and levelled off toward G'≈2 MPa for ≥10 wt % D2 (Examples 3-6). At the same time, the latter materials (Examples 3-6) experienced a sharp decrease of their moduli and viscosities at their melting temperatures. Hence, we obtained "inherently reinforced" polyisobutylene-based thermoplastic elastomers that exhibited superior shear properties and showed lower creep behaviour at room temperature, but yielded well-processable melts at elevated temperatures, well below their decomposition temperature.

Table 1 shows representative values of storage moduli G', loss moduli G", loss factors tan δ, and viscosities |η*| for different grades of polyisobutylenes, M0-M5, D0-D2, as well as Examples 1-6.

Figure 15:
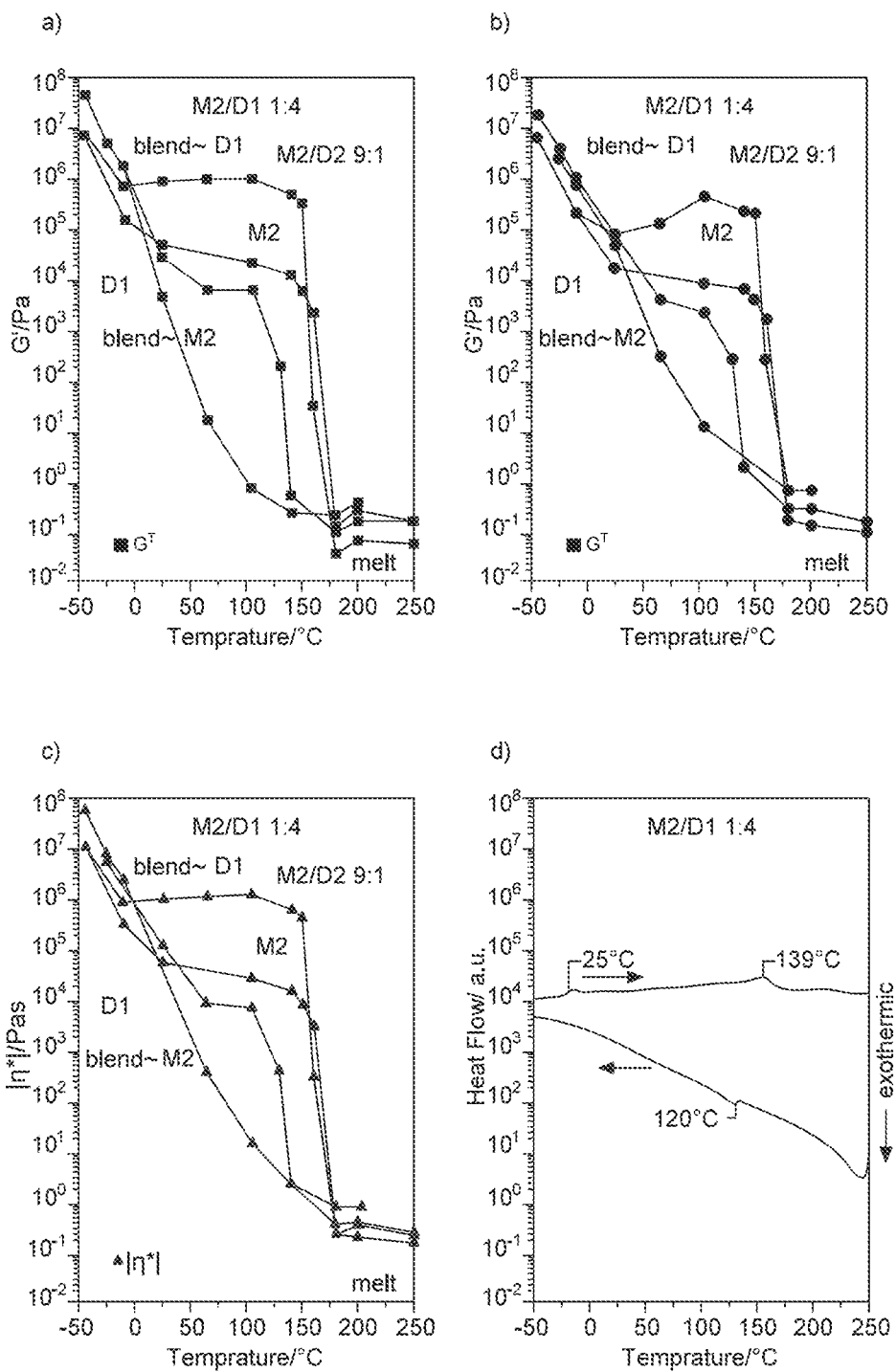

Referring in particular to FIGS. 15-22 (Examples 7-10):

FIG. 15. a-c) Temperature-dependent shear rheology of the blend M2/D1 1:4 (Example 7), compared to pure M2, pure D1, as well as the blend M2/D2 9:1 (Example 3). Plots of a) storage modulus G', b) loss modulus G", and c) viscosity |η*| (formally defined as $|\eta^*|=p_{21,0}/(\gamma_0 \cdot \omega)$ was used as a calculated entity to compare both liquid and rubbery materials) at 1 rad/s as a function of temperature revealed that the material underwent a two-stage thermomechanical transition, first following the behaviour of D1 in the temperature range of −45° C. to above room temperature, and then M2 between 65° C. and the melting transition at 139° C. d) Differential scanning calorimetry showed that the blend M2/D1 9:1 (Example 7) exhibited a transition at about 25° C. (assigned to the melting of the D1 network) as well as a reversible transitions at 139° C. (onset at 128° C.; 0.5 J/g) that we assigned to the reversible deaggregation of the β-sheet aggregates of M2. While the apparent 'melting point depression' as compared to pure M2 (170° C.) suggests a certain interaction between D1 and M2 in that temperature range, the pronounced effect of the minority component M2, the two-stage temperature transition, and the superimposed rheological properties of the pure components in the blend provide sufficient evidence for the presence of two independent, 'interpenetrating supramolecular networks' that do not undergo macrophase segregation.

Figure 16:
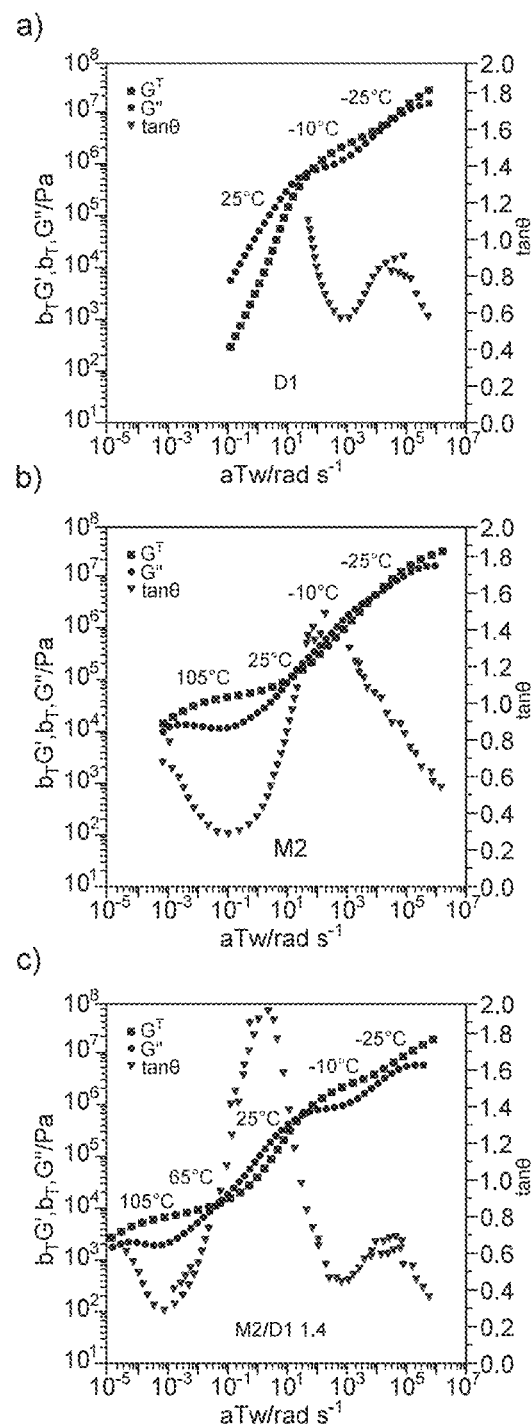

FIG. 16. a-c) Rheological time-temperature superposition (TTS) master curves of D1, M2, and M2/D1 1:4 (Example 7) at $T_{ref}$=25° C. D1 showed an entanglement point at 25° C. M2 exhibited a large tan δ peak at an unusual temperature as compared to high molecular weight PIB. M2/D1 1:4 (Example 7) possessed a broad region with pronounced 'liquid-like' behaviour and a large loss factor of up to tan δ=2.0.

Figure 17:
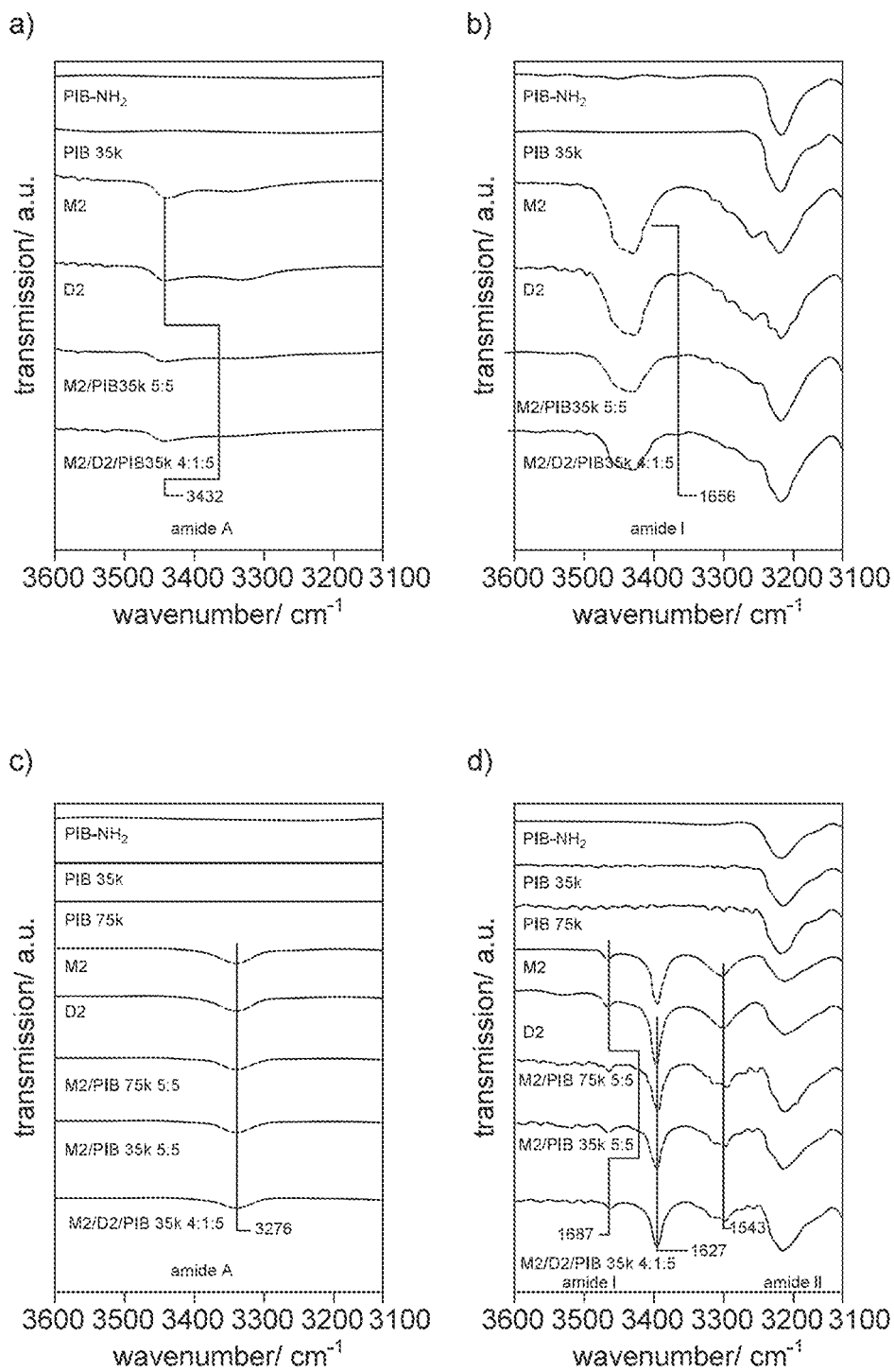
FIG. 17 shows amide A, amide I and amide II regions of the solid-state infrared (IR) spectra of a,b) solution phase IR spectra of samples in tetrachlorethane and c,d) solid state IR spectra of bulk samples of PIB (MW 75'000), PIB (MW 35'000), M2, D2, as well as different binary and ternary blends of M2 and D2 in PIB (MW 75'000) or PIB (MW 35'000) (Examples 8-10), FIG. 18 a) represents differential scanning calorimetry of M2, D2 and their binary and ternary blends M2/PIB (MW 35'000) 5:5 (Example 9) and M2/D2/PIB (Mw 35'000) 4:1:5 (Example 10), and FIG. 18 b) shows thermogravimetric analysis of M2, D2 and their binary and ternary blends M2/PIB (MW 35'000) 5:5 (Example 9) and M2/D2/PIB (Mw 35'000) 4:1:5 (Example 10) as well as for PIB-$NH_2$ and $H_2$N-PIB-$NH_2$.

FIG. 17. Amide A, amide I and amide II regions of the solid-state infrared (IR) spectra of a,b) solution phase IR spectra of samples in tetrachlorethane and c,d) sold state IR spectra of bulk samples of PIB (MW 75'000), PIB (MW 35'000), M2, D2, as well as different binary and ternary blends of M2 and D2 in PIB (MW 75'000) or PIB (MW 35'000) (Examples 8-10). All mixtures were deaggregated in solution, but bulk materials exhibited a single amide A absorption at 3276 $cm^{-1}$, a strong and sharp amide I absorption at 1627 $cm^{-1}$, a smaller absorption at 1687 $cm^{-1}$ and an amide II absorption at 1543 $cm^{-1}$, consistent with the presence of highly ordered antiparallel β-sheet structures. Moreover, independent of their composition, the blends exhibited and amide I regions indistinguishable from the pure compounds, providing evidence for the presence of antiparallel β-sheet structures dispersed in a PIB matrix.

Figure 18:
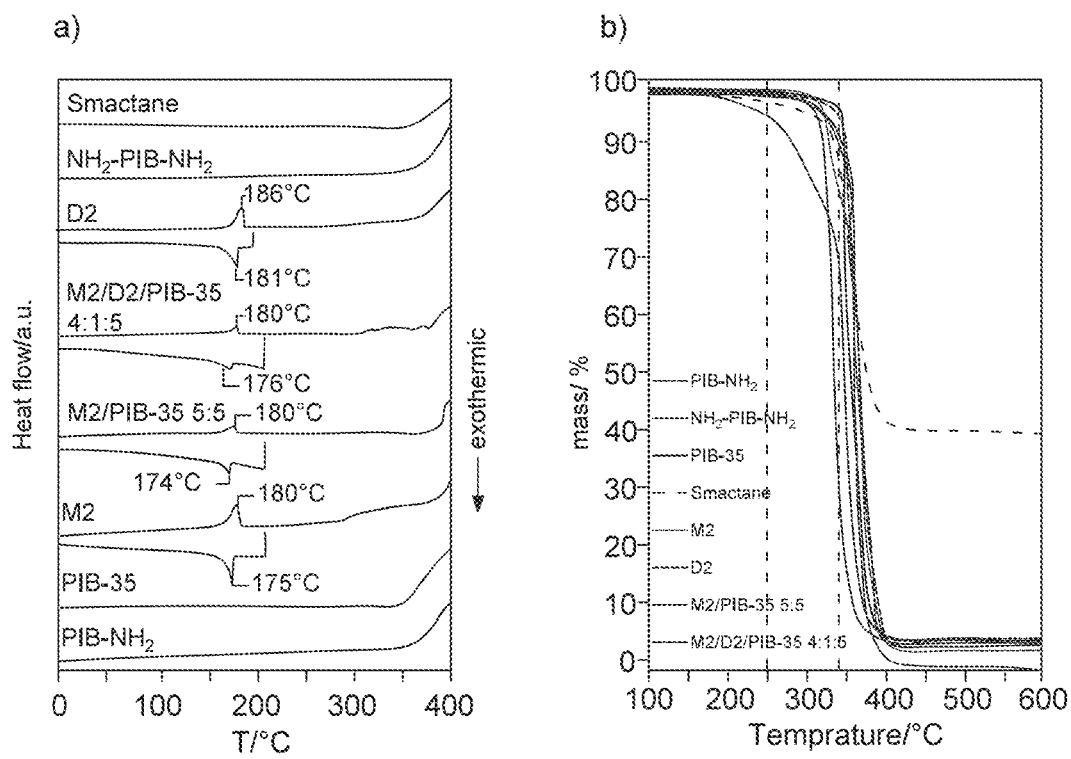

FIG. 18 a) Differential scanning calorimetry revealed that M2, D2 and their binary and ternary blends M2/PIB (MW 35'000) 5:5 (Example 9) and M2/D2/PIB (Mw 35'000) 4:1:5 (Example 10) exhibited reversible thermal transitions at the onset temperatures of 170° C. (16 J/g), 178° C. (17 J/g), 172° C. (6.2 J/g) and 169° C. (6.1 J/g) respectively. These could be assigned to the 'melting' (deaggregation) and 'crystallization' (aggregation) of the β-sheet aggregates. b) Thermogravimetric analysis revealed that all materials except PIB—NH2 and Smactane™ stable up to temperatures of at least 250° C. Complete PIB depolymerization occurred at temperatures above 340° C. for M2, D2 and their blends.

Figure 19:
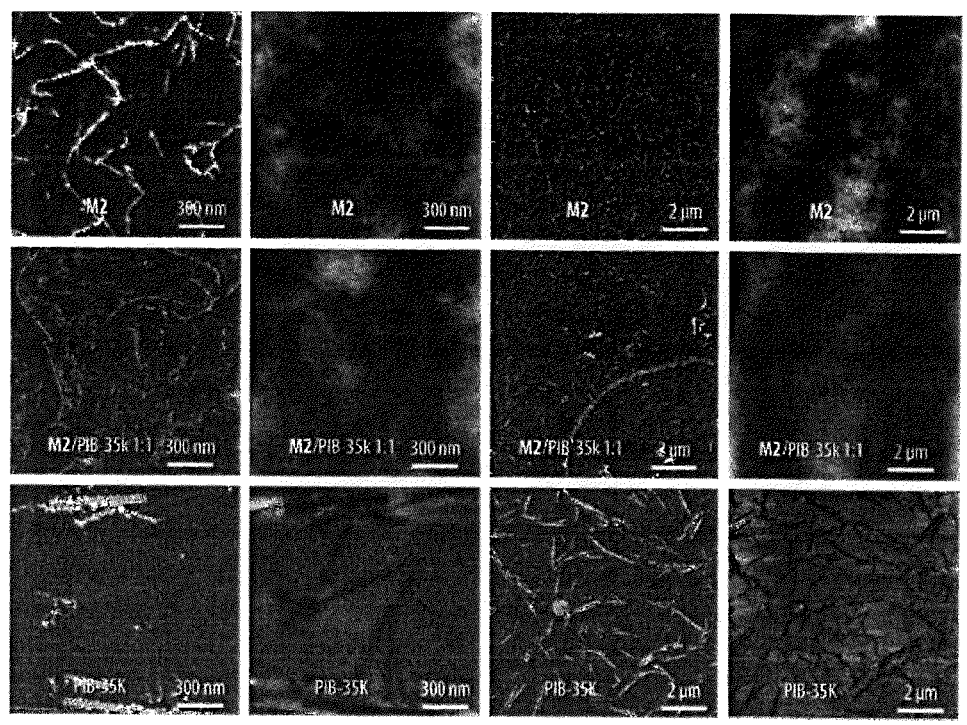
FIG. 19 shows atomic force microscopy (AFM) height (left) and phase (right) images of M2 and M2/PIB (MW 35'000) 5:5 (Example 9), FIG. 20 a-f) show rheological time-temperature superposition (TTS) master curves of M2/PIB (MW 75'000) 5:5 (Example 8), M2/PIB (MW 35'000) 5:5 (Example 9), M2/D2/PIB (MW 35'000) 4:1:5 (Example 10)

FIG. 19 Atomic force microscopy (AFM) height (left) and phase (right) images of M2 and M2/PIB (MW 35'000) 5:5 (Example 9) drop-cast from tetrachlorethane solution onto $SiO_2$ substrates revealed the formation of β-sheet fibrils, while AFM images of pure PIB (MW 35'000) did not show such features.

FIG. 20 a-f) Rheological time-temperature superposition (TTS) master curves of M2/PIB (MW 75'000) 5:5 (Example 8), M2/PIB (MW 35'000) 5:5 (Example 9), M2/D2/PIB (MW 35'000) 4:1:5 (Example 10), in comparison to unmodified higher molecular weight PIB (MW 35'000, MW 75'000, MW 200'000) as well as Smactane™ (hollow symbols in other graphs) as reference materials at $T_{ref}$=25° C. The blends gave rise to soft materials with a loss factor of tan δ>0.6 over almost the whole frequency range investigated.

FIG. 21 a) Experimental setup for a random vibration modal analysis test on a sandwich structure comprising a damping layer. The first resonance frequency of the steel structure at 32.9 Hz and its intensity decrease in the sandwich structure for PIB (MW 200'00), M2, for M2/D2/PIB (75 k) 5:5 (Example 8), M2/D2/PIB (35 k) 5:5 (Example 9), M2/D2/PIB (35 k) 4:1:5 (Example 10) as well as Smactane™. b) Finite element simulations of the same sandwich configurations for damping layers based on the same materials as well as additional commercial damping materials. c) The experimental (circles) and calculated (squares) loss moduli G" considered as the "figure of merit" for the vibration damping ability in constrained layers plotted relative to the damping ratio with a exponential fit presented here only as a guide. These experimental G" values were taken at 200 rad/s from a classical rheological frequency sweep test at 25° C.

FIG. 22 a-e) Lissajous curves obtained from oscillatory shear stress-strain test, performed on a rheometer at −45° C. and 25 rad/s with a theoretical γ (% strain) value imposed of 0.05%. a) Smactane™ with γ=0.05%, b) PIB (Mw 200'000) with γ=0.045%, c) M2 with γ=0.05%, d) M2/PIB (MW 35'000) 5:5 (Example 9) with γ=0.068%, e) M2/D2/PIB (MW 35'000) 4:1:5 (Example 10) with γ=0.043%. The areas of the latter represent dissipated energies during one cycle of these tests. f-h) Plots of the logarithm of the dissipated energies relative to the logarithm of the strain applied at −45° C. during an oscillatory shear stress-strain test, performed on a rheometer. Based on the mathematical equation: $W_d = n G'' \varepsilon_0^2$, fitting equations of f) PIB (Mw 200'000), g) M2/PIB (MW 35'000) 5:5 (Example 9) h) M2/D2/PIB (MW 35'000) 4:1:5 (Example 10) were used in order to correct the values of energies dissipated for a γ (% strain) value of 0.05% for all the five materials.

Binary and ternary blends of compounds with "non-matching" oligopeptides (different oligopeptide length or amino acid sequence, including non-functionalised polymers) were found to give rise to novel "interpenetrating supramolecular networks". Specifically, binary blends (compositions by weight) of M2/D1 1:4 (Example 7), M2/polyisobutylene MW 75'000 (Example 8), M2/polyisobutylene MW 35'000 (Example 9), as well as the ternary blend M2/D2/polyisobutylene (MW 35'000) 4:1:5 (Example 10) were obtained by dissolving mixtures of the compounds in tetrachlorethane (TCE), stirring the solutions at room temperature for 16 h, removing the solvent in vacuo, and drying the resulting materials in high vacuum at 120° C. for 3 days. The annealing temperature was chosen such that it was below the melting transition of the tape-forming component M2 but above the softening temperature of the second network-forming component (D1 or polyisobutylene). In the case of Example 7, the gelation point of M2 and the entanglement point of D1 were superimposed in their blends, resulting in materials with both a gelation and an entanglement point within a similar frequency range (in a classical rheological frequency sweep at 25° C.). Thus the material exhibited a large frequency region with pronounced liquid-like behaviour (that is, G''>G') at room temperature, confined by two regions of solid elastomer-like (G'>G") behaviour at higher and lower shear frequencies, as seen from a rheological time-temperature superposition (TTS) master curve at 25° C. (all shift factors log $a_T$ and log $b_T$ for the TTS master curves listed in Table 2). Whilst high molecular weight polyisobutylene materials may exhibit such regions of "liquid-like" behaviour at temperatures just above their glass transition temperature of $T_g \approx -65°$ C., Example 7 showed such behaviour over a large temperature range and a broad frequency range at room temperature, exhibiting a large loss factor of up to tan δ=2.0 in this region, which is unprecedented in related materials. Upon heating Example 7 above the materials' glass-transition temperature of about $T_g = -55°$ C., both its storage and loss moduli as well as viscosity first closely followed those of D1. At about 65° C., where pure D1 is already in its liquid regime, the storage and loss moduli became similar to those of M2 and remained constant up to the melting transition at above 139° C. The pronounced effect of the minority component M2, the two-stage temperature transition, and the superimposed rheological properties of the pure components in the blend provide sufficient evidence for the presence of two independent hydrogen-bonded superstructures, resulting in an "interpenetrating supramolecular network". Whereas the high frequency boundary of the "liquid-like" region can be assigned to the hydrogen-bonded network formed by D1, the low frequency boundary is associated to a percolation network of the M2 β-sheet tapes.

The observed pronounced "liquid-like" behaviour (in a certain temperature and mechanical frequency range), that is, the apparent molecular level properties approaching liquid-like properties (such as flow) in a solid and macroscopically shape-persistent polymer materials is the prerequisite for the self-healing properties of the materials disclosed here.

For the various blends of M2, D2, and polyisobutylenes (Examples 8-10), Solution-phase IR spectra in chlorinated solvents showed that all mixtures remained non-aggregated in solution. This enabled us to obtain homogenous blends from solution, so as to obtain hydrogen-bonded aggregates from M2 dispersed in PIB as a matrix material (Examples 8-9) that can be cross-linked using the difunctional network-forming difunctional D2 (Example 10). Solid-state infrared (IR) spectroscopy of the bulk materials revealed strongly aggregated and highly ordered antiparallel β-sheet structures. Thermogravimetric analysis (TGA) and differential scanning calorimetry (DSC) proved that the materials were thermally stable (against degradation) up to at least 250° C. All materials exhibited sharp and reversible thermal transitions at temperatures of 169-178° C. Comparing the enthalpies of fusion of pure M2 and D2 (16-17 J/g) to those of the blends (6-6.5 J/g), we concluded that 75-80% of the oligopeptide-modified components were aggregated into β-sheet tapes or fibrils in the blends. Moreover, temperature-dependent solid-state IR spectroscopy on the materials proved that the observed transition was associated to β-sheet deaggregation in all cases. Visualization of the nanoscopic morphologies of the obtained aggregates by means of atomic force microscopy (AFM) imaging of continuous 1 μm thick films drop-cast from TCE solution onto $SiO_2$ substrates proved that β-sheet tape or fibril structures were present in those bulk materials.

In order to evaluate the mechanical properties of Examples 8-10, we tested their rheological properties in comparison to unmodified higher molecular weight polyisobutylenes (MW 35'000, 75'000, and 200,000). Compared to Smactane™, PIB (MW 200'000) showed lower storage (G') and loss moduli (G") over the whole range of frequencies ($10^{-4}$-$10^6$ rad/s) or temperatures (−45° C.-105° C.) investigated, but a slightly higher and broader peak of the loss factor tan δ (as a function of frequency), corresponding to its glass transition. Likewise, pure M2 and the blends M2/PIB (Examples 8-9) showed significantly lower storage and loss moduli over a frequency range of $10^{-4}$-$10^3$ rad/s, but significantly higher loss factors of tan δ≈1 for a large frequency range. Examples 8 and 9, for instance, gave rise to a soft rubber-like material with storage and loss moduli G' and G" that were very similar to one another over almost the complete range of investigated frequencies, as determined from a TTS master curve at room temperature (all shift factors log $a_T$ and log $b_T$ for the TTS master curves listed in Table 2). As a result, the loss factor of Examples 8 and 9 peaked at tan δ=1.1 at a reduced frequency of about $a_T\omega=5\times 10^4$ rad/s and never fell below tan δ=0.6 in the reduced frequency range of $a_T\omega=10^{-3}$-$10^6$ rad/s. The ternary blend M2/D2/PIB (MW 35'000) 4:1:5 (Example 10) possesses higher storage and loss moduli as well as similar loss factors compared to Smactane™, but with even improved moduli and loss factor at low frequencies, due to the addition of D2 which acts as a network forming crosslinker, resulting in an extra reinforcement of the materials. Moreover, the obtained master curves had a substantially different shape as compared to either pure M2 or unmodified polyisobutylenes. Specifically, the rubbery plateau in the low-frequency regime was absent, indicating that neither does M2 just serve as a filler, nor does the polyisobutylene matrix just act as a diluting "solvent". One can therefore attribute the large temperature and frequency range of high loss factor tan δ values to an interpenetration of the PIB entanglement network and a percolation network formed by the M2 δ-sheet tapes. The resulting supramolecular networks exhibit an improved vibration damping performance was attributed to improved energy dissipation by the high fraction of pendant polymer chains incorporated into the network.

Such "interpenetrating supramolecular networks" as described here provide an alternative to traditional IPNs for the preparation of high performance vibration damping materials. In order to evaluate the performance of Examples 8-10 with other damping materials, we tested their shear vibration damping characteristics of the in comparison to unmodified higher molecular weight polyisobutylenes (MW 35'000, 75'000, and 200,000), as well as Smactane™, a commercially available high performance damping material with excellent damping properties specifically at low temperatures. To this end, we employed a random vibration modal analysis test on a sandwich structure representing a typical constrained damping layer application. The test structure was designed specifically to investigate the structural damping performance of the material in low frequency vibration (30-40 Hz), which is typical for the first vibration modes of many steel or aluminium panels used in automotive or aerospace applications. The specimen with a free length of 54 mm was fixed at one end while a weight of 4.6 g was clipped to the other one. The beam was excited using a pseudo random signal using a vibration shaker driven through an open loop random vibration controller. Accelerometers were used to monitor the base and tip accelerations and reconstruct the frequency response function of the system around its first resonance peak. The modal damping ratio was obtained by single-degree-of-freedom modal curve fitting of the resonance peak in the complex domain.

All results of the damping tests and derived damping ratios are listed in Table 3.

The first resonance frequency for steel, in this particular set up, occurred at 32 Hz and was slightly damped by steel itself and its clamping on the base (0.4%). However, damping ratio significantly increased to 2.9% once Smactane™ was used as the damping layer in the sandwich structure. By comparison, while unmodified high molecular weight PIB (MW 200'000) exhibited a low damping ratio of 1.4%, the damping ratios were 3.2% for pure M2, 2.6% for the binary blend M2/PIB (MW 75'000) (Example 8), 2.5% for the binary blend M2/PIB (MW 35'000) (Example 9), and 3.4% for the ternary blend M2/D2/PIB (MW 35'000) (Example 10). Examples 9 and 10 thus showed excellent damping ratios, even exceeding those of the commercially available high-performance damping material Smactane™ and by far surpassing those of unmodified PIB that is considered to possess good damping properties and is already used in damping applications on a technological scale.

Moreover, we complemented our results with detailed finite element (FE) simulations of the sandwich beam vibration tests. We performed the simulations also on other high-performance damping materials as a reference, including Smactane™, Soundcoat™ Dyad 601 and 3M ISD™ 130.54 using their rheology data as the input to the FE simulations. In qualitative agreement with the experimental results, the finite element simulations resulted in damping ratios of Examples 8-10 above those of the reference materials.

The damping properties of the investigated materials at low temperatures were obtained using the loss moduli G" obtained from rheological frequency sweep experiments at those temperatures and calculating the dissipated energies during one cycle of oscillatory stress-strain test from the area of the corresponding Lissajous curves (corrected for the imposed strain).

The calculated damping properties at low temperatures are listed in Table 4.

All of the investigated materials and, in particular, the ternary blend M2/D2/PIB (MW 35'0000) (Example 10) exhibit excellent damping properties at temperatures of −45° C. and below, down to their glass transition temperatures at about $T_g \approx -65°$ C., even exceeding those of Smactane™ and in marked contrast to PIB (MW 200,000) that possesses lower loss moduli over the whole range of frequencies (0.1-100 rad/s) tested at −45° C.

All commercial reference materials (except PIB) are composites with formulations highly optimized for damping performance. It is worth noting that, as a consequence, our materials were light (with a density of 0.92 g/cm$^3$ compared to 1.18 g/cm$^3$ for Smactane™) and did not require any additional fillers or low molecular weight plasticizers. Moreover, as the "ideal" damping characteristics depend on the application, the versatility offered by the use of oligopeptide-modified polymers as additives to commercial elastomers appears to provide an excellent pathway towards light-weight, low-creep, and high-performance constrained layers for vibro-acoustic damping.

Referring in Particular to FIGS. 23-25 (Examples 11-13):

FIG. 23 shows AFM phase images and differential scanning calorimetry measurements that prove that oligopeptide aggregation competes with polymer phase segregation in blends of M2/S2 and M3/S3 and leads to nanoscale phase segregation. a) Whereas blends of M2 with unmodified polystyrene (9:1) as a reference material domains (white) with average sizes of hundreds of nanometers in diameter, only very few such polystyrene domains could be observed in blends M2/S2 (9:1) (Example 11) that were otherwise mostly homogeneous. b) In differential scanning calorimetry measurements, the glass transition of PS could be identified in both cases, demonstrating that even in the blend M2/S2 (9:1) (Example 11) nanoscale polystyrene domains are present. c) Blends of M3 with unmodified polystyrene (9:1) as a reference material forms polystyrene domains (white) with average sizes of dozens of nanometers in diameter, and no such polystyrene domains were observed in blend M3/S3 (9:1) (Example 12). d) In this case, the polystyrene glass transition was only observed in the differential scanning calorimetry measurements of the reference materials and not in the blend M3/S3 (9:1) (Example 12), proving that the polystyrene domain size was now so small that no cooperative properties such as a glass transition were observed.

FIG. 24 shows a) storage moduli G' and b) loss moduli G" determined by rheological dynamic frequency sweep experiments at 25° C. of M2, S2, the blend of M2 with unmodified polystyrene (9:1) and the blend M2/S2 9:1 (Example 11); c) shows storage moduli G' and d) loss moduli G" determined by rheological dynamic frequency sweep experiments at 25° C. of M3, S3, the blend of M3 with unmodified polystyrene (9:1) and the blend M3/S3 9:1 (Example 12). Notably, whereas the storage and loss moduli of the blends of either M2 or M3 with unmodified polystyrene (9:1) increased slightly compared to the pure M2 and M3, respectively, a strong increase in the storage and loss moduli was observed for the two blends M2/S2 9:1 (Example 11) and M3/S3 9:1 (Example 12). In particular, in the low frequency range, the addition of 10 wt % of S3 in the blend M3/S3 9:1 (Example 12) is sufficient to achieve a ten-fold increase in storage modulus G'. This proves that the polystyrene domains in these blends served to "glue together" the oligopeptide aggregates (tapes and nanofibrils), giving rise to a new percolation network of hard domains within the material.

FIG. 25 shows a rheological time-temperature superposition master curve at a reference temperature of 25° C. of the ternary blend M3/S3/PIB (MW 35'000) 9:3:12 (Example 13). The storage moduli G', loss moduli G" and the loss factor tan δ are reported for a large range of reduced frequency ($10^6$-$10^{-4}$ rad s$^{-1}$), as well as temperature range (−45° C. to 65° C.). The γ (% strain) values used for these experiments was 0.1% and were selected to be in the linear regime of the investigated materials. The TTS master curve revealed that the tan δ was higher than 0.35 over a large frequency range of $10^{-3}$-$10^{-5}$ rad s$^{-1}$, and the G" was higher than 1 Mpa for frequencies higher than 10 rad s$^{-1}$. This combination of a large temperature range of a large loss factor and a high storage modulus is ideal for good, temperature-invariant damping properties. Accordingly, the material showed a very high damping ratio of ξ=3.3% in constrained layer damping tests on a sandwich structure at a resonance frequency of 32 Hz, as described in previous examples.

2. Preparative Examples

2.1 Instrumentation and Methods

NMR Spectroscopy was carried out on a Bruker Avance 300 spectrometer operating at a frequency of 300.23 MHz for $^1$H and 75.49 MHz for $^{13}$C nuclei, or on a Bruker Avance 400 spectrometer operating at a frequency of 400.23 MHz for $^1$H and 100.63 MHz for $^{13}$C nuclei. Deuterated solvents were purchased from Cambridge Isotope Laboratories. The spectra were calibrated to the respective residual proton peaks of the deuterated solvents ($^1$H NMR: 7.26 ppm CDCl$_3$, 6.0 ppm TCE-d$_2$, 5.32 ppm, DMSO-D$_6$, 3.31 ppm CD$_3$OD; $^{13}$C NMR: 77.16 ppm CDCl$_3$, 49.00 ppm CD$_3$OD, 39.52 ppm DMSO-D$_6$).

Solution—Phase FTIR Spectra were recorded on a "Spectrum One" IR spectrometer from Perkin Elmer using a solution-phase cuvette with KBr windows and a light path of 0.5 mm, or on a Jasco FT/IR-6300 Fourier, using a KBr window 32×3 mm (by Pike Technology). The materials were dissolved in either TCE or CHCl$_3$ (5 mg/mL). The TCE solutions were stirred for 1 h at 100° C. and left to slowly cool to room temperature. The CHCl$_3$ solutions were stirred at RT for 1-16 h.

Solid-State FTIR Spectra were recorded on a Bruker ALPHA FTIR spectrometer or on a JASCO FT/IR 6300 spectrometer using the Miracle ATR accessory from PIKE, as well as on a Varian Fourier Transform spectrometer equipped with a Golden Gate diamond ATR with temperature control up to 200° C.

High Resolution Mass Spectra were recorded at the Mass Spectrometry Service of EPFL on either an AXIMA Performance device from Shimadzu Biotech for MALDI-TOF and a Q-TOF Ultima from Waters for ESI-TOF, or at the Mass Spectrometry Service of ETH Zurich on a Bruker Daltonics maXis for HiRes-ESI-MS.

Thermogravimetric Analyses were performed on a TGA Q500 device from TA Instruments, loaded with samples of more than 2 mg. The measurement range was 50-710° C. in a nitrogen atmosphere or 50-914° C. in air. A heating rate of 10° C./min was applied in all cases.

Differential Scanning calorimetry was performed on a DSC Q1000 from TA Instruments in a nitrogen atmosphere, loaded with samples of more than 2 mg. For the measurement of glass transition or melting temperatures, three measurements were performed in the range of −80 to 400° C. Both the heating and cooling rates were 10° C./min. All data were collected from the second heating cycle.

Combustion Elemental Analyses were carried out as service measurements at EPFL using EA 1100 CHN Instrument or at the Institute of Organic Chemistry at ETH Zurich using a LECO CHN/900 instrument.

AFM Imaging was performed on a Nanoscope IIIa instrument. Samples were prepared from stock solutions of the compounds in tetrachlorethane (TCE) at an initial concentration c=10$^{-5}$ mol/L. The solutions were placed into sealed tubes, vigorously stirred (400 rpm) and heated in an oil bath to 180° C. for 2 h, followed by stepwise cooling 160° C. (1 h), 140° C. (1 h), 120° C. (1 h), and 100° C. (1 h) under continued stirring (100 rpm). Afterwards, the heating was switched off and the solution was allowed to cool to room temperature at the same stirring rate. The solutions were then diluted to a concentration of c=1×10$^{-4}$ mol/L or c=5×10$^{-5}$ mol/L and spin-coated onto SiO$_2$ substrates treated with ethanol and ultrapure water (3000 rpm) or onto freshly cleaved HOPG (1800 rpm). The obtained samples were analyzed in tapping mode at room temperature in air, using cantilevers with an average resonance frequency of 75 kHz and scan rates of 0.5-1.5 Hz. The image resolution was 512×512 pixels.

Dynamic Shear Rheology Measurements were carried out on parallel plate rheometers AR 2000, ARES LR2 or ARES from TA Instruments. Disc shaped sample specimen from all materials that were shape-persistent were prepared on a Rittal table press. A force of 2 kN was applied for 30 min at 100° C., after which the specimen were cooled to 20° C. at a force of 1.1 kN for 30 min. Depending on the samples quantity, aluminium plates of 15 mm or 25 mm diameter, as well as stainless steel plates of 25 mm diameter were used. Discs of 12 mm diameter were prepared as well and placed in the centre of the stainless steel plates (25 mm diameter) with a centring tool. The gap between the plates was in the range of 0.4-2 mm. In the case of non-adhesive samples, the plates were covered with emery paper to avoid wall slipping. Measurements were carried out at temperatures of −45° C. to 250° C. Once the desired temperature was reached, the system was equilibrated for 2 min. Frequency sweeps ranging from 100 rad s$^{-1}$ to 0.01 rad s$^{-1}$ were carried out under controlled strain. Depending on the sample composition and temperature, the strain amplitude ranged from 0.03% to 50%. The applied strain was defined such that the sample stayed in its linear viscoelastic domain during the complete frequency sweep.

Modal Damping Tests were carried out on a RMS 3000 vibration shaker using an HP 35670A vibration controller and signal analyzer in open loop pseudo random vibration analysis. The acceleration of the base and of the tip of the specimen were monitored using two Bruel&Kaer 4517 accelerometer through a B&K Nexus 2692 amplifier. The frequency transfer functions of the different specimens were measured in a frequency range of 10 to 110 Hz with a resolution of 0.125 Hz. The test specimen consisted of a sandwich structure representing a constrained damping layer application. The base substrate was a steel plate with dimensions of 60×6×0.5 mm onto which a damping layer with dimensions of 40×0.6×2.2 mm was superimposed. A thin steel plate with dimensions of 40×0.6×0.2 mm was used to constrain the top of the damping layer. The sandwich test structure was then clamped with one end to the vibration table over a length of 6 mm, and a mass of 4.6 g was added to the free end of the beam over a length of 5 mm. The added mass has been calculated such that the first bending mode of the sandwich beam is in the range of 30-40 Hz. In order to determine the modal damping ratio ξ, the first peak of the frequency response function was first fitted using a complex polynomial fraction least square method integrated in the HP 35670A signal analyzer. The modal damping ratio ξ was then calculated from the real part λ and the imaginary part ω of the first complex pole of the polynomial fraction using the definition ξ=λ/ω.

Finite Element Simulations of the sandwich beam vibration tests have been carried out to compare the damping performance of M2/PIB with other high performance damping materials in this particular application. The chosen specimen geometry was the same as the sandwich beam specimen used in the experimental modal damping tests (60×6×0.5 mm steel base plate with a 40×0.6×2.2 mm damping layer constrained on top by a 40×0.6×0.2 mm steel sheet). The base plate was modelled as being clamped to the shaker on one side (imposed displacement, no rotation, over 6 mm) and attached to two steel blocks of 5×5×15 mm. The steel plates were modelled as linear elastic with a Young modulus of 210 GPa, Poisson ratio of 0.3 and mass density of 7,800 kg/m$^3$. The damping layer materials were all considered incompressible and modelled using an Arruda-Boyce hyperelastic potential (power exponent of 7) with complex shear moduli taken from rheology measurements or literature data (Table 3). The whole specimen was modelled using 2640 3D hybrid quadratic hexahedric elements (14345 nodes) in Simulia Abaqus© 6.10 (FIG. 4e in the main paper) and subjected to a steady state harmonic simulation in a frequency range of 20-70 Hz with a resolution of 0.333 Hz to capture in detail the first resonance peak at around 34 Hz. The simulated frequency response functions (tip vs base acceleration in the direction of the γ axis) were then processed to extract the modal damping ratio ξ (Table 3) using a single degree of freedom complex curve fitting method.

2.2 Materials and General Synthesis Procedures

Materials.

Reagents were purchased as reagent grade from commercial sources and used without further purification. Poly (isobutylene) 1 (Kerocom™ PIBA) was obtained from BASF and purified from non-functionalized poly(isobutylene) by column chromatography prior to use. Poly(isobutylene) diamine 4 containing about 10% of monofunctional poly(isobutylene) amine was obtained from BASF SE, Germany, and used without further purification. THF, acetonitrile, toluene, dichloromethane and triethylamine were purchased as HPLC grade and dried using a solvent purification system from Innovative technologies. Other solvents were purchased as reagent grade and distilled once prior to use. Thin Layer Chromatography (TLC) Analyses were performed on TLC plates from Merck; UV-light (254 nm) or standard colouring reagents were used for detection. Column Chromatography was conducted on Geduran® Silica gel Si 60 from Merck (40-60 μm).

Sample Preparation. For the preparation of films and solid samples of either single compounds or blends, the oligopeptide-polymer derivatives and/or PIB (MW 75,000) were dissolved in either TCE or CHCl$_3$, the solutions were stirred at room temperature for 1-16 h, and concentrated in vacuo. The resulting materials were dried in HV at 120° C. for 3 days.

General Procedure A: Peptide Coupling. The carboxylic acid derivative was dissolved in THF. The amine (1 equiv) was added, as well as N-ethyldiisopropylamine (DIEA; 3 equiv) and (benzotriazol-1-yloxy)tripyrrolidinophosphonium hexafluorophosphate (PyBOP; 1.2 equiv). The solution was stirred for 3-16 h, and the reaction progress was monitored by TLC. The crude product was typically purified by precipitation into water (see General Procedures C or D). Specific purification or sample preparation procedures were performed before further characterization in some cases.

General Procedure B: Fmoc Deprotection. The Fmoc-protected amine derivatives were dissolved in CHCl$_3$. Then, a large excess of piperidine (15 equiv) was added, and the solution was stirred over night. The reaction progress was monitored by TLC. After completion of the reaction, the solvents were removed in vacuo. Unless otherwise noted, the crude product was purified by column chromatography.

General Procedure C: Precipitation of Compounds Soluble in THF. After completion of the reaction affording the desired compound, the reaction mixture was concentrated to half of its original volume. A large excess of aqueous 1 M HCl solution was added. The resulting precipitate was filtered off, re-dissolved in THF and precipitated again, following the same procedure as described above. After three repetitive precipitations, the crude product was finally dissolved in CH$_2$Cl$_2$, CHCl$_3$ or THF. The solution was dried over MgSO$_4$ and concentrated in vacuo at 40° C.

General Procedure D: Precipitation of Compounds Insoluble in THF. After completion of the reaction affording the desired compound, the reaction mixture was diluted with a large excess of aqueous 1 M HCl solution. The precipitate was collected and re-dispersed in THF at 60° C. The product was precipitated again using the same procedure as described above two more times. The precipitate was finally re-dispersed in THF and concentrated in vacuo at 40° C.

2.3 Synthesis Procedures and Analytical Data for 2-3, 5-6, M0-M5 and D0-D5

Synthesis of PIB$_{19}$-Ala$_3$-Fmoc 2. Following General Procedure A, PIB$_{19}$—NH$_2$ 1 (14.55 g, 12.03 mmol) and N-(9-fluorenylmethyloxycarbonyl)-L-alanyl-L-alanyl-L-alanine (6.0 g, 13.23 mmol) were dissolved in THF (250 mL). DIEA (6.18 mL, 36.08 mmol) and PyBOP (7.51 g, 14.43 mmol) were added. The reaction mixture was stirred overnight. The product was precipitated following General Procedure C. The final product (19.2 g, 97%) was obtained as a slightly yellow wax. $^1$H NMR (400 MHz, CDCl$_3$) δ=7.75 (d, J=7.5 Hz, 2H, aromatic H), 7.57 (d, J=7.5 Hz, 2H, aromatic H), 7.52 (m, 1H, NH), 7.38 (d, J=7.4 Hz, 2H, aromatic H), 7.29 (t, J=7.4 Hz, 2H, aromatic H), 7.13 (m, 1H, NH), 6.76 (m, 1H, NH), 5.84 (m, 1H, NH), 4.73-4.29 (m, 5H, Fmoc-CO$_2$CH$_2$, 3 CHCH$_3$), 4.20 (t, J=7.0 Hz, 2H, fluorenyl CH), 3.31-3.07 (m, 2H, CH$_2$NH), 1.81-0.53 (m, 178H, aliphatic H, 3 CHCH$_3$). MS (MALDI-TOF, DCTB/NaTFA 10:1): calcd for C$_{73}$H$_{126}$N$_4$O$_5$Na: (n=10[M+Na]+) 1161.9620. found: 1161.8517. R$_f$: 0.45 (CH$_2$Cl$_2$/MeOH 10:1). DSC (10° C./min, N$_2$) T$_g$=−66° C.

Synthesis of PIB$_{19}$-Ala$_3$-H 3. Following General Procedure B, PIB$_{19}$-Ala$_n$-Fmoc 2 (17.2 g, 10.46 mmol) was dissolved in CHCl$_3$ (250 mL). Piperidine (10.35 ml, 104.57 mmol) was added, and the reaction mixture was stirred at room temperature overnight. The crude product was purified by column chromatography (silica gel, gradient CH$_2$Cl$_2$→CH$_2$Cl$_2$/MeOH 5:1). The final product (10 g, 67%) was obtained as a slightly yellow wax. 1H NMR (400 MHz, CDCl$_3$) δ=7.83 (d, J=7.3 Hz, 1H, NH), 7.10 (m, 1H, NH), 6.46 (m, 1H, NH), 4.45 (m, 2H, CHCH$_3$), 3.51 (q, J=6.9 Hz, 1H, CHCH$_3$NH$_2$), 3.4-3.1 (m, 2H, CH$_2$NH), 1.82-0.65 (m, 178H, aliphatic H, 3 CHCH$_3$). MS (MALDI-TOF, DHB): calcd for C$_{58}$H$_{116}$N$_4$O$_3$Na: (n=10 [M+Na]$^+$) 939.8940. found: 940.0981. R$_f$: 0.15 (CH$_2$Cl$_2$/MeOH 10:1). DSC (10° C./min, N$_2$) T$_g$=−68° C.

Synthesis of Fmoc-Ala$_3$-PIB$_{40}$-Ala$_3$-Fmoc 5. Following General Procedure A, N-(9-fluorenylmethyloxycarbonyl)-L-alanyl-L-alanyl-L-alanine (4.36 g, 9.61 mmol) and NH$_2$—PIB$_{40}$—NH$_2$ 4 (10.9 g, 4.28 mmol) were dissolved in THF (400 mL). DIEA (2.47 mL, 14.42 mmol) and PyBOP (5.50 g, 10.58 mmol) were added. After 16 h, the crude product was precipitated following General Procedure D. The final product (14.18 g, 94%) was obtained as a white solid. $^1$H NMR (400 MHz, C$_2$D$_2$Cl$_4$ at 110° C.) δ=7.81 (d, J=7.5 Hz, 4H, aromatic H), 7.63 (d, J=7.3 Hz, 4H, aromatic H), 7.50-7.41 (m, 5H, aromatic H), 7.4-7.3 (m, 4H, aromatic H), 7.21 (m, 3H, aromatic H), 6.52 (m, 2H, NH), 6.34 (m, 2H, NH), 6.00 (m, 2H, NH), 5.16 (m, 2H, NH), 4.63-4.08 (m, 12H, 6 CHCH$_3$, 2 Fmoc-CO$_2$CH$_2$, 2 fluorenyl CH), 3.37-2.94 (m, 4H, 2CH$_2$NH), 1.94 (s, 4H, 2CH$_2$C(CH$_3$)$_2$Ph), 1.62-0.98 (m, 346H, aliphatic H, 6 CHCH$_3$), 0.95 (s, 12H, 2PhC(CH$_3$)2). MS (MALDI-TOF, DCTB): calcd for C$_{104}$H$_{158}$N$_8$O$_{10}$Na: (n+m=9 [M+Na]$^+$) 1702.1993. found: 1702.3004. R$_f$: 0.4 (CH$_2$Cl$_2$/MeOH 10:1). DSC (10° C./min, N$_2$) T$_g$=−55° C.

Synthesis of H-Ala$_3$-PIB$_{40}$-Ala$_3$-H 6. Following General Procedure B, Fmoc-Ala$_3$-PIB$_{40}$-Ala$_3$-Fmoc 5 (11.00 g, 3.2 mmol) was dissolved in CHCl$_3$ (200 mL). Piperidine (200 ml, 2.02 mol) was added, and the reaction mixture was stirred at room temperature overnight. The next day, the solvent was evaporated in vacuo, and the mixture was washed three times with cold heptane. The crude product was then dispersed in DCM and concentrated in vacuo at 40° C. Finally, the product (7.76 g, 82%) was obtained as a white solid. $^1$H NMR (400 MHz, CDCl$_3$ and TFA) δ=7.96 (m, 2H, NH), 7.71 (m, 6H, NH2+TFA), 7.47 (m, 2H, NH), 7.38 (m, 1H, aromatic H), 7.21-7.06 (m, 3H, aromatic H), 6.88 (m, 2H, NH), 4.7-4.2 (m, 4H, CHCH$_3$), 3.41-2.79 (m, 6H, 2 CH$_2$NH, 1 CH$_2$NH$_2$), 1.84 (s, 4H, 2CH$_2$C(CH$_3$)$_2$Ph), 1.77-0.87 (m, 346H, aliphatic H, 6CHCH$_3$), 0.80 (s, 12H, 2 PhC(CH$_3$)$_2$). MS (MALDI-TOF, DHB): calcd for C$_{82}$H$_{155}$N$_8$O$_6$: (n+m=11 [M+H]$^+$) 1348.2065. found: 1348.5963. R$_f$: 0.05 (CH$_2$Cl$_2$/MeOH 10:1). DSC (10° C./min, N$_2$) T$_g$=−65° C.

Synthesis of PIB$_{19}$-Ac M0. PIB$_{19}$—NH$_2$ 1 (3.85 g, 3.18 mmol) was dissolved in THF (80 mL). Acetyl chloride (0.454 mL, 6.37 mmol) and pyridine (0.642 mL, 7.96 mmol) were added. The reaction mixture was stirred overnight. The crude product was precipitated following General Procedure C. The final product (3.53 g, 88%) was obtained as a slightly yellow viscous oil. $^1$H NMR (400 MHz, CDCl$_3$) δ=5.36 (m, 1H, NH), 3.47-3.08 (m, 2H, CH$_2$NH), 1.96 (s, 3H, C═OCH$_3$), 1.73-0.60 (m, 169H, aliphatic H). MS (MALDI-TOF, DCTB/NaTFA 10:1): calcd for C$_{51}$H$_{103}$NONa (n=10 [M+Na]$^+$) 768.7932. found 768.9546. R$_f$: 0.85 (CH$_2$Cl$_2$/MeOH 10:1). DSC (10° C./min, N2) T$_g$=−67° C.

Synthesis of PIB$_{19}$-Ala-Ac M1. Following General Procedure A, PIB$_{19}$—NH$_2$ 1 (3.69 g, 3.05 mmol) and N-acetyl-L-alanine (0.4 g, 3.05 mmol) were dissolved in THF (100 mL). DIEA (1.57 mL, 9.15 mmol) and PyBOP (1.9 g, 3.66 mmol) were added. The reaction mixture was stirred overnight. The product was precipitated following General Procedure C. The final product (3.9 g, 97%) was obtained as a slightly yellow viscous oil. $^1$H NMR (400 MHz, CDCl$_3$ and TFA) δ=7.91 (d, J=7.6 Hz, 1H, NH), 6.87 (m, 1H, NH), 4.75-4.36 (m, 1H, CHCH$_3$), 3.30 (m, 2H, CH$_2$NH), 2.16 (s, 3H, C═OCH$_3$), 1.64-0.84 (m, 172H, aliphatic H, 1 CHCH$_3$). MS (MALDI-TOF, DCTB/NaTFA 10:1): calcd for C$_{54}$H$_{108}$N$_2$O$_2$Na: (n=10 [M+Na]$^+$) 839.8303. found: 839.6927. R$_f$: 0.55 (CH$_2$Cl$_2$/MeOH 10:1). DSC (10° C./min, N$_2$) T$_g$=−65° C.

Synthesis of PIB$_{19}$-Ala2-Ac M2. Following General Procedure A, PIB$_{19}$—NH$_2$ 1 (17.48 g, 14.46 mmol) and N-acetyl-L-alanyl-L-alanine (3.8 g, 18.79 mmol) were dissolved in THF (250 mL). DIEA (4.95 mL, 28.91 mmol) and PyBOP (9.03 g, 17.35 mmol) were added. The reaction mixture was stirred overnight. The product was precipitated following General Procedure C. The final product (19.5 g, 97%) was obtained as a slightly yellow wax. $^1$H NMR (400 MHz, CDCl$_3$) δ=7.44 (m, 1H, NH), 7.00 (m, 1H, NH), 6.74 (m, 1H, NH), 4.70 (m, 1H, CHCH$_3$), 4.59 (m, 1H, CHCH$_3$), 3.45-3.09 (m, 2H, CH$_2$NH), 2.05 (s, 3H, C═OCH$_3$), 1.62-0.64 (m, 175H, aliphatic H, 2 CHCH$_3$). MS (MALDI-TOF, CHCA/NaTFA 1:1): calcd for C$_{57}$H$_{113}$N$_3$O$_3$Na: (n=10 [M+Na]$^+$) 910.8674. found: 910.7816. R$_f$: 0.4 (CH$_2$C$_{12}$/MeOH 10:1). DSC (10° C./min, N2) T$_g$=−68° C., T$_m$=170° C.

Synthesis of PIB$_{19}$-Ala$_3$-Ac M3. PIB$_{19}$-Ala$_3$-H 3 (2.99 g, 2.1 mmol) was dissolved in THF (150 mL). Acetyl chloride (0.3 mL, 4.2 mmol) and pyridine (0.424 mL, 5.25 mmol) were added and the reaction mixture was stirred overnight. The next day, the product was precipitated following General Procedure C. The final product (3.0 g, 98%) was obtained as a slightly yellow wax. $^1$H NMR (400 MHz, CDCl$_3$ and TFA) δ=7.58 (m, 2H, NH), 7.13 (m, 1H, NH), 6.90 (m, 1H, NH), 4.66-4.55 (m, 3H, CHCH$_3$), 3.26 (m, 2H, CH$_2$NH), 2.11 (s, 3H, C═OCH$_3$), 1.70-0.57 (m, 178H, aliphatic H, 3 CHCH$_3$). MS (MALDI-TOF, CHCA/NaTFA 1:1): calcd for C$_{60}$H$_{118}$N$_4$O$_4$Na: (n=10 [M+Na]$^+$) 981.9045. found: 981.8898. R$_f$: 0.25 (CH2Cl2/MeOH 10:1). DSC (10° C./min, N2) T$_g$=−67° C.

Synthesis of PIB$_{19}$-Ala$_4$-Ac M4. Following General Procedure A, PIB$_{19}$-Ala$_3$-H 3 (2.0 g, 1.41 mmol) and N-acetyl-L-alanine (184.36 mg, 1.41 mmol) were dissolved in THF (200 mL). DIEA (0.722 mL, 4.22 mmol) and PyBOP (877.98 mg, 1.69 mmol) were added. The reaction mixture was stirred overnight. The product was precipitated following General Procedure C. The final product (2.0 g, 90%) was obtained as a white rubber. $^1$H NMR (400 MHz, CDCl$_3$ and TFA) δ=7.83 (d, J=7.4 Hz, 1H, NH), 7.60 (m, 1H, NH), 7.34 (d, J=6.1 Hz, 1H, NH), 7.27 (m, 1H, NH), 6.80 (m, 1H, NH), 4.89-4.22 (m, 4H, CHCH$_3$), 3.45-3.09 (m, 2H, CH$_2$NH), 2.14 (s, 3H, C═OCH$_3$), 1.65-0.74 (m, 181H, aliphatic H, 4 CHCH$_3$). MS (MALDI-TOF, CHCA/NaTFA 1:1): calcd for C$_{63}$H$_{123}$N$_5$O$_5$Na: (n=10 [M+Na]$^+$) 1052.9416. found: 1052.8131. R$_f$: 0.1 (CH$_2$Cl$_2$/MeOH 10:1). DSC (10° C./min, N2) T$_g$=−66° C.

Synthesis of PIB$_{19}$-Ala$_5$-Ac M5. Following General Procedure A, PIB$_{19}$-Ala$_3$-H 3 (2.0 g, 1.41 mmol) and N-acetyl-L-alanyl-L-alanine (284.29 mg, 1.41 mmol) were dissolved in THF (200 mL). DIEA (0.722 mL, 4.22 mmol) and PyBOP (877.98 mg, 1.69 mmol) were added. The reaction mixture was stirred overnight. The product was precipitated following General Procedure C. The final product (2.2 g, 95%) was obtained as a white rubber. $^1$H NMR (400 MHz, C$_2$D$_2$Cl$_4$ and TFA at 65° C.) δ=7.44 (d, J=6.9 Hz, 1H, NH), 7.16 (m, 3H, NH), 6.81 (m, 1H, NH), 6.56 (m, 1H, NH), 4.67-4.42 (m, 5H, CHCH$_3$), 3.45-3.09 (m, 2H, CH$_2$NH), 2.17 (s, 3H, C═OCH$_3$), 1.84-0.68 (m, 184H, aliphatic H, 5 CHCH$_3$). MS (MALDI-TOF, CHCA): calcd for C$_{66}$H$_{128}$N$_6$O$_6$Na: (n=10 [M+Na]$^+$) 1123.9788. found: 1124.3684. R$_f$: 0.05 (CH$_2$Cl$_2$/MeOH 10:1). DSC (10° C./min, N2) T$_g$=−69° C.

Synthesis of Ac-PIB$_{40}$-Ac D0. NH$_2$—PIB$_{40}$—NH$_2$ 4 (5.00 g, 1.96 mmol) was dissolved in THF (200 mL). Acetyl chloride (0.80 mL, 11.22 mmol) and pyridine (0.9 mL, 11.22 mmol) were added, and the solution was stirred overnight. The next day, the crude product was precipitated following General Procedure C. The final product (4.4 g, 85%) was obtained as a colourless viscous oil. $^1$H NMR (400 MHz, CDCl$_3$) δ=7.37 (m, 1H, aromatic H), 7.23-7.06 (m, 3H, aromatic H), 5.44 (m, 2H, NH), 3.2-2.9 (m, 4H, 2 CH$_2$NH), 1.98 (s, 6H, C═OCH$_3$), 1.84 (s, 4H, 2CH$_2$C(CH$_3$)$_2$Ph), 1.75-0.86 (m, 328H, aliphatic H), 0.80 (s, 12H, 2 PhC(CH$_3$)$_2$). MS (MALDI-TOF, DCTB): calcd for C$_{76}$H$_{144}$N$_2$O$_2$Na: (n+m=13 [M+Na]$^+$) 1140.1120. found: 1139.5068. R$_f$: 0.7 (CH$_2$Cl$_2$/MeOH 10:1). DSC (10° C./min, N2) T$_g$=−55° C.

Synthesis of Ac-Ala-PIB$_{40}$-Ala-Ac D1. Following General Procedure A, N-acetyl-L-alanine (810.0 mg, 6.17 mmol) and NH$_2$—PIB$_{40}$—NH$_2$ 4 (7.00 g, 2.75 mmol) were dissolved in THF (200 mL). DIEA (1.58 mL, 9.26 mmol) and PyBOP (3.53 g, 6.79 mmol) were added. After 16 h, the crude product was precipitated following General Procedure C. The final product (5.12 g, 66%) was obtained as a yellow glue. $^1$H NMR (400 MHz, CDCl$_3$) δ=7.37 (m, 1H, aromatic H), 7.23-7.06 (m, 3H, aromatic H), 6.17 (m, 4H, NH), 4.45 (m, 2H, CHCH$_3$), 3.25-2.9 (m, 4H, 2 CH$_2$NH), 2.00 (s, 6H, C=OCH$_3$), 1.84 (s, 4H, 2CH$_2$C(CH$_3$)$_2$Ph), 1.76-0.85 (m, 334H, aliphatic H, 2 CHCH$_3$), 0.80 (s, 12H, 2 PhC(CH$_3$)$_2$). MS (MALDI-TOF, DCTB): calcd for C$_{86}$H$_{162}$N$_4$O$_4$Na: (n+m=14 [M+Na]$^+$) 1338.2488. found: 1338.2838. R$_f$: 0.5 (CH$_2$Cl$_2$/MeOH 10:1). DSC (10° C./min, N$_2$) T$_g$=−54° C.

Synthesis of Ac-Ala$_2$-PIB$_{40}$-Ala$_2$-Ac D2. Following General Procedure A, N-acetyl-L-alanyl-L-alanine (700.0 mg, 3.46 mmol) and NH$_2$—PIB$_{40}$—NH$_2$ 4 (3.93 g, 1.54 mmol) were dissolved in THF (300 mL). DIEA (0.89 mL, 5.19 mmol) and PyBOP (1.98 g, 3.81 mmol) were added, and the reaction mixture was stirred overnight. The next day, the crude product was precipitated following General Procedure D. The final product (4.0 g, 89%) was obtained as an off-white solid. $^1$H NMR (400 MHz, CDCl$_3$ and TFA) δ=7.64-7.3 (m, 6H, NH), 7.37 (m, 1H, aromatic H), 7.23-7.06 (m, 3H, aromatic H), 4.7-4.5 (m, 4H, CHCH$_3$), 3.25-2.9 (m, 4H, 2 CH$_2$NH), 2.07 (s, 6H, C=OCH$_3$), 1.84 (s, 4H, 2CH$_2$C(CH$_3$)$_2$Ph), 1.77-0.86 (m, 300H, aliphatic H, 4 CHCH$_3$), 0.80 (s, 12H, 2 PhC(CH$_3$)$_2$). MS (MALDI-TOF, DCTB): calcd for C$_{92}$H$_{172}$N$_6$O$_6$Na: (n+m=14 [M+Na]$^+$) 1480.3231. found: 1480.6152. R$_f$: 0.4 (CH$_2$Cl$_2$/MeOH 10:1). DSC (10° C./min, N2) T$_g$=−57° C., T$_m$=178° C.

Synthesis of Ac-Ala$_3$-PIB$_{40}$-Ala$_3$-Ac D3. H-Ala$_3$-PIB$_{40}$-Ala$_3$-H 6 (1.50 g, 0.50 mmol) was dissolved in THF (200 mL). Acetyl chloride (0.16 mL, 2.23 mmol) and pyridine (0.18 mL, 2.23 mmol) were added, and the reaction mixture was stirred over night. The next day, the crude product was precipitated General Procedure D. The final product (1.43 g, 92%) was obtained as an off-white solid. $^1$H NMR (400 MHz, CDCl$_3$ and TFA) δ=8.1-7.5 (m, 5H, NH), 7.38 (m, 2H, aromatic H, NH), 7.21-7.06 (m, 3H, aromatic H), 6.83 (m, 2H, NH), 4.7-4.3 (m, 6H, CHCH$_3$), 3.35-2.95 (m, 4H, 2 CH$_2$NH), 2.12 (s, 6H, C=OCH$_3$), 1.84 (s, 4H, 2CH$_2$C(CH$_3$)$_2$Ph), 1.77-0.86 (m, 346H, aliphatic H, 6CHCH$_3$), 0.80 (s, 12H, 2 PhC(CH$_3$)$_2$). MS (ESI-TOF): calcd for C$_{74}$H$_{135}$N$_8$O$_8$Na: (n=8 [M+H+Na]$^{2+}$) 643.5145. found: 646.5165. R$_f$: 0.3 (CH$_2$Cl$_2$/MeOH 10:1). DSC (10° C./min, N2) T$_g$=−55° C.

Synthesis of Ac-Ala$_4$-PIB$_{40}$-Ala$_4$-Ac D4. Following General Procedure A, N-acetyl-L-alanine (146.0 mg, 1.11 mmol) and H-Ala$_3$-PIB$_{40}$-Ala$_3$-H 6 (1.50 g, 0.50 mmol) were dissolved in THF (200 mL). DIEA (215.83 mL, 1.67 mmol) and PyBOP (637.3 mg, 1.22 mmol) were added. After 16 h, the crude product was precipitated following General Procedure D. The final product (1.49 g, 91%) was obtained as an off-white solid. $^1$H NMR (400 MHz, CDCl$_3$ and TFA) δ=8.1-7.5 (m, 6H, NH), 7.38 (m, 2H, aromatic H, NH), 7.21-7.06 (m, 4H, 3 aromatic H, NH), 6.83 (m, 2H, NH), 4.7-4.35 (m, 8H, CHCH$_3$), 3.35-2.95 (m, 4H, 2 CH$_2$NH), 2.12 (s, 6H, C=OCH$_3$), 1.84 (s, 4H, 2CH$_2$C(CH$_3$)$_2$Ph), 1.77-0.86 (m, 352H, aliphatic H, 8 CHCH$_3$), 0.80 (s, 12H, 2PhC(CH$_3$)$_2$). MS (ESI-TOF): calcd for C$_{92}$H$_{170}$N$_{10}$O$_{10}$: (n+m=11 [M+2H]$^{2+}$) 787.6545. found: 787.1820. R$_f$: 0.3 (CH$_2$Cl$_2$/MeOH 10:1). DSC (10° C./min, N2) T$_g$=−55° C.

Synthesis of Ac-Ala$_5$-PIB$_{40}$-Ala$_5$-Ac D5. Following General Procedure A, N-acetyl-L-alanyl-L-alanine (195.1 mg, 0.96 mmol) and H-Ala$_3$-PIB$_{40}$-Ala$_3$-H 6 (1.30 g, 0.43 mmol) were dissolved in THF (200 mL). DIEA (0.25 mL, 1.45 mmol) and PyBOP (552.3 mg, 1.06 mmol) were added. After 16 h, the crude product was precipitated following General Procedure D. The final product (1.30 g, 88%) was obtained as off-white solid. $^1$H NMR (400 MHz, CDCl$_3$ and TFA) δ=8.1-7.5 (m, 10H, NH), 7.38 (m, 2H, aromatic H, NH), 7.21-7.06 (m, 3H, aromatic H), 6.85 (m, 1H, NH), 4.7-4.2 (m, 10H, CHCH$_3$), 3.35-2.95 (m, 4H, 2 CH$_2$NH), 2.12 (s, 6H, C=OCH$_3$), 1.84 (s, 4H, 2CH$_2$C(CH$_3$)$_2$Ph), 1.77-0.86 (m, 358H, aliphatic H, 10 CHCH$_3$), 0.80 (s, 12H, 2PhC(CH$_3$)$_2$). MS (ESI-TOF): calcd for C$_{98}$H$_{178}$N$_{12}$O$_{12}$Na: (n+m=11 [M+Na]$^+$) 1739.3613. found: 1740.5134. R$_f$: 0.25 (CH$_2$Cl$_2$/MeOH 10:1). DSC (10° C./min, N$_2$) T$_g$=−54° C.

Synthesis of PS$_{15}$—NH$_2$ 7. Styrene (12.19 g, 117.1 mmol) was freshly distilled from CaH$_2$ prior to use. A rigorously dried 250 mL Schlenk flask was filled with dry cyclohexane (50 mL), and sec-butyl lithium (5.6 mL, 7.8 mmol, 1.4 M solution in cyclohexane) was added slowly via a syringe at 10° C. Under vigorous stirring, styrene was added via a syringe as fast as possible, leading to a yellow to orange color of the solution. The cooling bath was removed and the mixture was stirred for 1 h. Then, 2.5 excess of 1-(3-bromopropyl)-2,2,5,5-tetramethyl-1-aza-2,5-disilacyclopentane (5.47 g, 19.5 mmol) dissolved in dry THF (20 mL) was added via a syringe, causing an immediate decoloration. The mixture was stirred for 2 h at room temperature, then was concentrated in vacuo and taken up in THF (100 mL). Then, 1M HCl (35 mL) was added, and stirring was continued over night. The mixture was concentrated in vacuo, taken up in CH$_2$Cl$_2$, washed twice with 1M KOH and once with sat. NaCl solution. The combined organic phases were dried over MgSO$_4$, filtered, and concentrated in vacuo. The crude product was purified by column chromatography (silica gel, gradient CH$_2$Cl$_2$→CH$_2$Cl$_2$/MeOH 20:1). The amine terminated polystyrene (9.2 g, 70%) was obtained as a white solid. $^1$H NMR (400 MHz, CDCl$_3$) δ=7.25-6.3 (m, 75H, Ph-H), 2.48 (m, 2H, CH$_2$NH$_2$), 2.36-0.5 (m, 58H, 15 CH$_2$CHPh, 3 CH$_2$, 1CHCH$_3$, 2CH$_3$). MS (ESI-TOF): calcd for C$_{127}$H$_{138}$N: (n=15 [M+H]$^+$) 1678.0858. found: 1677.9187. R$_f$: 0.35 (CH$_2$Cl$_2$/MeOH 10:1).

Synthesis of PS$_{15}$-Ala$_3$-Fmoc 8. Following General Procedure A, PS$_{15}$—NH$_2$ (5.04 g, 3.01 mmol) and N-(9-fluorenylmethyloxycarbonyl)-L-alanyl-L-alanyl-L-alanine (1.50 g, 3.31 mmol) were dissolved in THF (250 mL). DIEA (1.54 mL, 9.02 mmol) and PyBOP (1.88 g, 3.61 mmol) were added. The reaction mixture was stirred overnight. The product was precipitated following General Procedure C. The final product (6.0 g, 95%) was obtained as a pinkish solid. $^1$H NMR (400 MHz, CDCl$_3$) δ=7.76 (d, J=7.8 Hz, 2H, aromatic H), 7.55 (d, J=7.5 Hz, 2H, aromatic H), 7.41 (t, J=7.4 Hz, 2H, aromatic H), 7.32 (t, J=7.3 Hz, 2H, aromatic H), δ=7.3-6.3 (m, 75H, Ph-H), 6.23 (s, 1H, NH), 5.20 (s, 1H, NH), 4.50-4.29 (m, 5H, Fmoc-CO$_2$CH$_2$, 3CHCH$_3$), 4.17 (m, 2H, fluorenyl CH), 3.02 (m, 2H, CH$_2$NH), 2.5-0.5 (m, 67H, 15CH$_2$CHPh, 5CH$_2$, 3CHCH$_3$, C=OCH$_3$).

Synthesis of PS$_{15}$-Ala$_3$-H 9. Following General Procedure B, PS$_{15}$-Ala$_3$-Fmoc (5.4 g, 2.56 mmol) was dissolved in CHCl$_3$ (250 mL). Piperidine (5.06 ml, 51.11 mmol) was added, and the reaction mixture was stirred at room temperature overnight. The crude product was purified by column chromatography (silica gel, gradient CH$_2$Cl$_2$→CH$_2$Cl$_2$/MeOH 50:1). The final product (3.55 g, 75%) was obtained as yellowish powder. $^1$H NMR (400 MHz, CDCl$_3$) δ=7.70 (m, 1H, NH), δ=7.3-6.3 (m, 75H, Ph-H), 5.90 (m, 1H, NH), 4.31 (m, 2H, CHCH$_3$), 3.45 (m, 1H, CHCH$_3$NH$_2$), 3.02 (m, 2H, CH$_2$NH), 2.5-0.5 (m, 67H, 15 CH$_2$CHPh, 5 CH$_2$, 3CHCH$_3$, C=OCH$_3$).

Synthesis of PS$_{15}$-Ala$_2$-Ac S2. Following General Procedure A, PS$_{15}$—NH$_2$ (3.0 g, 1.79 mmol) and N-acetyl-1-alanyl-1-alanine (0.36 g, 1.79 mmol) were dissolved in THF (250 mL). DIEA (1.22 mL, 7.15 mmol) and PyBOP (1.4 g, 2.68 mmol) were added. The reaction mixture was stirred overnight. The product was precipitated following General Procedure C. The final product (2.2 g, 67%) was obtained as pinkish solid. $^1$H NMR (400 MHz, CDCl$_3$) δ=7.3-6.3 (m, 75H, Ph-H), 6.10 (d, J=6.1 Hz, 1H, NH), 5.79 (s, 1H, NH), 4.42 (m, 1H, CHCH$_3$), 4.29 (m, 1H, CHCH$_3$), 3.02 (m, 2H, CH$_2$NH), 2.5-0.5 (m, 67H, 15CH$_2$CHPh, 5 CH$_2$, 3 CHCH$_3$, C=OCH$_3$).

Synthesis of PS$_{15}$-Ala$_3$-Ac S3. PS$_{15}$-Ala$_3$-H (1.2 g, 0.63 mmol) was dissolved in THF (50 mL). Acetyl chloride (136 mL, 1.9 mmol) and pyridine (0.205 mL, 2.54 mmol) were added and the reaction mixture was stirred overnight. The next day, the product was precipitated following General Procedure C. The final product (1.2 g, 98%) was obtained as white solid powder. $^1$H NMR (400 MHz, CDCl$_3$ and TFA) δ=7.3-6.3 (m, 75H, Ph-H), 5.0-4.6 (m, 3H, NH), 3.75 (m, 3H, CHCH$_3$), 3.03 (m, 2H, CH$_2$NH), 2.5-0.5 (m, 70H, 15CH$_2$CHPh, 5CH$_2$, 4CHCH$_3$, C=OCH$_3$).

Synthesis of PS$_{15}$-Ala$_4$-Ac S4. Following General Procedure A, PS$_{15}$-Ala$_3$-H (602.8 mg, 0.319 mmol) and N-acetyl-1-alanine (46.0 mg, 0.351 mmol) were dissolved in THF (30 mL). DIEA (0.17 mL, 0.957 mmol) and PyBOP (602.9 mg, 1.69 mmol) were added. The reaction mixture was stirred overnight. The product was precipitated following General Procedure C. The final product (0.6 g, 95%) was obtained as a white solid powder. $^1$H NMR (400 MHz, CDCl$_3$ and TFA) δ=7.3-6.3 (m, 75H, Ph-H), 5.5-4.6 (m, 4H, CHCH$_3$), 3.03 (m, 2H, CH$_2$NH), 2.5-0.5 (m, 73H, 15CH$_2$CHPh, 5CH$_2$, 5CHCH$_3$, C=OCH$_3$).

TABLE 1

Representative rheological data of M0-M5, D0-D2, polyisobutylenes of different molecular weights, as well as the blends M2/D2 99:1 (Example 1), M2/D2 95:5 (example 2), M2/D2 9:1 (Example 3), M2/D2 7:3 (Example 4), M2/D2 5:5 (Example 5), and M2/D2 1:9 (Example 6); storage moduli G', loss moduli G", loss factors tan δ, and shear viscosities |η*|.

| Materials | G'/Pa | G"/Pa | tan δ | |η*|/Pa · s) |
|---|---|---|---|---|
| M0 | 0.22 | 139 | 623 | 139 |
| M1 | 249 | 1250 | 5.02 | 1270 |
| M2 | 42800 | 14300 | 0.334 | 45200 |
| M3 | 251000 | 42900 | 0.171 | 254000 |
| M4 | 510000 | 40200 | 0.079 | 511000 |
| M5 | 633000 | 63900 | 0.101 | 636000 |
| D0 | 25 | 2690 | 109 | 2690 |
| D1 | 12300 | 70700 | 5.75 | 71800 |
| D2 | 2000000 | 117000 | 0.059 | 2010000 |
| PIB-NH$_2$ (MW 1200) | 0.19 | 32 | 168 | 32 |
| H$_2$N-PIB-NH$_2$ (MW 1200) | 4.99 | 234 | 46.9 | 235 |
| PIB (MW 35'000) | 13400 | 24600 | 1.84 | 28000 |
| PIB (MW 75'000) | 64500 | 42800 | 0.664 | 77500 |
| PIB (MW 200'000) | 231000 | 25270 | 0.109 | 232000 |
| PIB (MW 425'000) | 188100 | 11840 | 0.063 | 188400 |
| M2/D2 99:1 | 123000 | 21800 | 0.177 | 125000 |
| M2/D2 95:5 | 564000 | 47310 | 0.084 | 565000 |
| M2/D2 9:1 | 495000 | 29610 | 0.060 | 496000 |
| M2/D2 7:3 | 798000 | 52780 | 0.066 | 800000 |
| M2/D2 5:5 | 1760000 | 124000 | 0.070 | 1760000 |
| M2/D2 1:9 | 1500000 | 93880 | 0.063 | 1500000 |

TABLE 2

Shift factors log a$_T$ and log b$_T$ and activation energies E$_a$ obtained from the Arrhenius equation for the rheological measurements used in the time-temperature superposition master curves of polyisobutylenes of different molecular weights, pure M2 and D1, as well as the blends M2/D1 1:4 (Example 7), M2/PIB (MW 75'000) 5:5 (Example 8), M2/PIB (MW 35'000) 5:5 (Example 9), and M2/D2/PIB(MW 35'000) 4:1:5 (Example 10).

| Materials | T/° C. | log a$_T$ | log b$_T$ | E$_a$/J mol$^{-1}$ |
|---|---|---|---|---|
| PIB (200k) | −45 | 4.474 | 0.119 | 1055.8 |
| | −10 | 1.677 | 0.028 | |
| | 25 | 0 | 0 | |
| | 105 | −2.199 | −0.111 | |
| PIB (75k) | −45 | 3.889 | −0.17 | 986.91 |
| | −10 | 1.684 | 0.021 | |
| | 25 | 0 | 0 | |
| | 65 | −1.317 | −0.0048 | |
| | 105 | −2.271 | −0.099 | |
| PIB (35k) | −45 | 4.492 | 0.133 | 1080.16 |
| | −10 | 1.689 | 0.04 | |
| | 25 | 0 | 0 | |
| | 65 | −1.302 | −0.025 | |
| | 105 | −2.356 | −0.166 | |
| M2 | −45 | 4.317 | −0.089 | 1040.6 |
| | −10 | 1.65 | −0.066 | |
| | 25 | 0 | 0 | |
| | 105 | −2.255 | 0.015 | |
| D1 | −25 | 3.901 | −0.033 | 1735.8 |
| | −10 | 2.991 | 0.137 | |
| | 25 | 0 | 0 | |
| M2/D1 1:4 | −25 | 3.93 | −0.024 | 1585.7 |
| | −10 | 2.998 | 0.112 | |
| | 25 | 0 | 0 | |
| | 65 | −1.918 | 0.115 | |
| | 105 | −3.928 | −0.119 | |
| M2/PIB (75k) 5:5 | −25 | 3.901 | −0.033 | 1078.1 |
| | −45 | 4.305 | 0.033 | |
| | −10 | 1.701 | 0.035 | |
| | 25 | 0 | 0 | |
| | 65 | −1.282 | −0.024 | |
| | 105 | −2.573 | −0.216 | |
| M2/PIB (35k) 5:5 | −45 | 4.075 | −0.145 | 1111.9 |
| | −10 | 1.478 | −0.065 | |
| | 25 | 0 | 0 | |
| | 65 | −1.901 | −0.364 | |
| | 105 | −2.881 | −0.464 | |
| M2/D2/PIB (35k) 4:1:5 | −45 | 4.4 | 0.037 | 1136.3 |
| | −10 | 1.6 | 0.057 | |
| | 25 | 0 | 0 | |
| | 65 | −1.841 | −0.186 | |
| | 105 | −2.677 | −0.265 | |
| Smactane | −45 | 4.342 | −0.059 | 1194.3 |
| | −10 | 1.746 | 0.05 | |
| | 25 | 0 | 0 | |
| | 65 | −1.8 | −0.035 | |
| | 105 | −3.208 | −0.045 | |

TABLE 3

Storage moduli G' and loss moduli G" used as input in the finite element simulations, and the resonance frequencies ω and modal damping ratios ξ resulting from these simulations for the reference materials Smactane ™, PIB (MW 200'000), Soundcoat ™ Dyad 601, and 3M ISD 130, as well as M2 and the blends M2/PIB (MW 75'000) 5:5 (Example 8), M2/PIB (MW 35'000) 5:5 (Example 9), and M2/D2/PIB(MW 35'000) 4:1:5 (Example 10).

| Materials | G'/MPa | G"/MPa | ω/Hz | ξ |
|---|---|---|---|---|
| Smactane ™ | 1.01 | 0.47 | 36.1 | 1.8% |
| PIB (200k) | 0.317 | 0.148 | 35 | 0.70% |
| Soundcoat Dyad 601[2] | 1.26 | 0.756 | 36.5 | 2.6% |
| 3M ISD 130[1] | 0.094 | 0.036 | 34.6 | 0.20% |
| M2 | 0.424 | 0.524 | 35.3 | 2.3% |
| M2/PIB (75k) 5:5 | 0.509 | 0.442 | 35.396 | 1.89% |

TABLE 3-continued

Storage moduli G' and loss moduli G" used as input in the finite element simulations, and the resonance frequencies ω and modal damping ratios ξ resulting from these simulations for the reference materials Smactane ™, PIB (MW 200'000), Soundcoat ™ Dyad 601, and 3M ISD 130, as well as M2 and the blends M2/PIB (MW 75'000) 5:5 (Example 8), M2/PIB (MW 35'000) 5:5 (Example 9), and M2/D2/PIB(MW 35'000) 4:1:5 (Example 10).

| Materials | G'/MPa | G"/MPa | ω/Hz | ξ |
|---|---|---|---|---|
| M2/PIB (35k) 5:5 | 0.377 | 0.371 | 35.1 | 1.7% |
| M2/D2/PIB (35k) 4:1:5 | 1.48 | 0.83 | 36.8 | 2.8% |

TABLE 4

Calculation of the low-temperature damping properties. Loss modulus G" and loss factor tan δ at 200 rad/s (≈32 Hz) from a rheological frequency sweep at room temperature, first resonance frequency ω in the 'forced vibration tests' on sandwich structures, modal damping ratio ζ at room temperature, and calculated dissipated energy $W_d$ at −45° C. and 25 rad/s for steel, Smactane ™, PIB (MW 200'000), M2, M2/PIB (MW 35'000) 5:5 (Example 9), and M2/D2/PIB(MW 35'000) 4:1:5 (Example 10).

| | G"/MPa | tan δ | ω/Hz | ζ | $W_d$/J m$^{-3}$ |
|---|---|---|---|---|---|
| Steel | — | — | 32.2 | 0.4% | — |
| Smactane ™ | 0.47 | 0.45 | 34.9 | 2.9% | 5.98 |
| PIB (MW 200'000) | 0.15 | 0.45 | 32.4 | 1.1% | 3.95 |
| M2 | 0.54 | 1.3 | 33.4 | 3.2% | 13.29 |
| M2/PIB (35k) 5:5 | 0.37 | 1.0 | 33.4 | 2.5% | 11.09 |
| M2/D2/PIB (35k) 4:1:5 | 0.83 | 0.55 | 35.6 | 3.4% | 18.95 |

TABLE 5

Shift factors log $a_T$ and log $b_T$ for the rheological measurements used in the time-temperature superposition master curves of blends M3/S3/PIB (MW 35'000) 9:3:12 (Example 13).

| Materials | T/° C. | log $a_T$ | log $b_T$ |
|---|---|---|---|
| M3/S3/PIB (35k) | −45 | 4.220 | −0.220 |
| | −25 | 2.856 | −0.115 |
| | −10 | 1.600 | −0.170 |
| | 25 | 0 | 0 |
| | 65 | −2.454 | −0.033 |

The invention claimed is:

1. A polymer blend, comprising:
a first oligopeptide-terminal polymer component selected from the group consisting of:
a hydrophobic, flexible polymer having a glass transition temperature below 20° C. and only one monodisperse oligopeptide end group, the monodisperse oligopeptide end group having 1 to 5 amino acid repeating units; and
a hydrophobic, flexible polymer having a glass transition temperature below 20° C. and two monodisperse oligopeptide end groups; and
at least one additional polymer component which includes a hydrophobic, flexible polymer that has a glass transition temperature below 20° C. and is without an oligopeptide end group.

2. The polymer blend according to claim 1, wherein at least one of said first oligopeptide-terminal polymer component and said at least one additional polymer component comprises repeating units selected from the group consisting of isobutylene, butadiene, siloxane, acrylate, and fluoropolymer units.

3. The polymer blend according to claim 1, wherein at least one of said first oligopeptide-terminal polymer component and said at least one additional polymer component comprises one or more of isobutylene, isoprene or styrene units.

4. The polymer blend according to claim 1, wherein said first oligopeptide-terminal polymer component and said at least one additional polymer component include a hydrophobic, flexible isobutylene polymer having a glass transition temperature below 20° C. and only one monodisperse oligopeptide end group, the monodisperse oligopeptide end group having 1 to 5 amino acid repeating units, blended with a hydrophobic, flexible styrene polymer having a glass transition temperature below 20° C. and only one monodisperse oligopeptide end group, the monodisperse oligopeptide end group having 1 to 5 amino acid repeating units.

5. The polymer blend according to claim 4, wherein said at least one additional polymer component comprises a hydrophobic, flexible isobutylene polymer that has a glass transition temperature below 20° C. and is without an oligopeptide end group.

6. The polymer blend according to claim 1, wherein said hydrophobic, flexible polymer that has a glass transition temperature below 20° C. and is without an oligopeptide end group has a number average molecular weight exceeding 10,000.

7. The polymer blend according to claim 1, wherein an oligopeptide moiety of said first oligopeptide-terminal polymer component comprises L-alanine units.

8. The polymer blend according to claim 1, wherein a polymer segment of at least one of said first oligopeptide-terminal polymer component and said at least one additional polymer component is selected from the group consisting of: polyisobutylene, poly(isobutylene-co-isoprene), polyisoprene, polybutadiene, polysiloxane, polyacrylate, poly(ethylene-co-butylene), hydrogenated poly(isoprene), hydrogenated poly(butadiene), and a fluoropolymer.

9. The polymer blend according to claim 1, in the form of a shape-persistent thermoplastic elastomer.

10. The polymer blend according to claim 1, comprising interpenetrating supramolecular polymer networks in which two or more specific supramolecular interactions result in the formation of two or more independent, interpenetrating supramolecular networks with different transition temperatures, that is, deaggregation temperatures.

11. The polymer blend according to claim 1, wherein said hydrophobic, flexible polymer that is without an oligopeptide end group comprises the same type of polymer segment as said first oligopeptide-terminal polymer component.

12. A vibration damping material comprising the polymer blend according to claim 10.

13. The vibration damping material according to claim 12, wherein said first oligopeptide-terminal polymer component is a hydrophobic, flexible polyisobutylene polymer having only one monodisperse oligopeptide end group with 1 to 5 amino acid repeating units beyond its terminal amide group; wherein said at least one additional polymer component includes a hydrophobic, flexible polyisobutylene polymer having only one monodisperse oligopeptide end group with 1 to 5 amino acid repeating units beyond its terminal amide group; wherein said hydrophobic, flexible polymer that is without an oligopeptide end group is a hydrophobic, flexible polyisobutylene polymer; and wherein each of said hydrophobic, flexible polyisobutylene polymer having only one monodisperse oligopeptide end group has a different number of peptide units beyond its terminal amide group.

14. A vibration damping material comprising the polymer blend according to claim 1, wherein said at least one polymer is a hydrophobic, flexible polyisobutylene polymer having only one monodisperse oligopeptide end group and from 2 to 5 peptide units beyond its terminal amide group; and wherein said hydrophobic, flexible polymer without an oligopeptide end group is a hydrophobic, flexible polyisobutylene polymer.

15. The vibration damping material according to claim 14, wherein said hydrophobic, flexible polyisobutylene polymer having only one monodisperse oligopeptide end group has 2 peptide units beyond its terminal amide group.

16. A vibration damping material comprising the polymer blend according to claim 1, wherein said at least one polymer comprises a hydrophobic, flexible polyisobutylene polymer having only one monodisperse oligopeptide end group and from 1 to 5 peptide units beyond its terminal amide group and a hydrophobic, flexible polyisobutylene polymer having two monodisperse oligopeptide end groups and from 1 to 5 peptide units beyond its terminal amide group; wherein the hydrophobic, flexible polymer being without an oligopeptide end group is a hydrophobic, flexible polyisobutylene polymer; and wherein the hydrophobic, flexible polyisobutylene polymers having only one monodisperse oligopeptide end group and two monodisperse oligopeptide end groups have the same number of peptide units beyond their terminal amide group.

17. The vibration damping material according to claim 16, wherein each of the hydrophobic, flexible polyisobutylene polymers having only one monodisperse oligopeptide end group and two monodisperse oligopeptide end groups has 2 peptide units beyond its terminal amide group.

18. The vibration damping material according to claim 12, being a composite material including one or more of the following: a plasticizer; and a reinforcing filler comprising carbon fibre, carbon black, or silica particles.

19. The vibration damping material according to claim 12, in a form adapted to reduce vibration within a vehicle, the form being a pad or other layer which can be interposed between members of the vehicle subject to vibration.

20. A vehicle which includes the vibration damping material according to claim 12.

21. The vehicle according to claim 20, which is a motor vehicle or an aerospace vehicle.

22. A method of vibration damping which involves use of the polymer blend according to claim 1 upon or within a structure or a vehicle.

23. The polymer blend according to claim 1, wherein an oligopeptide moiety of said first oligopeptide-terminal polymer component consists of L-alanine units.

24. The polymer blend according to claim 1, wherein said first oligopeptide-terminal polymer component and said at least one additional polymer component include a hydrophobic, flexible polyisobutylene polymer having one or two monodisperse oligopeptide end groups blended with a hydrophobic, flexible polystyrene polymer having one or two monodisperse oligopeptide end groups.

25. The polymer blend according to claim 24, wherein said at least one additional polymer component comprises a hydrophobic, flexible polyisobutylene polymer that is without an oligopeptide end group.

26. The polymer blend according to claim 8, wherein said fluoropolymer is poly(tetrafluoroethylene-co-ethylene).

* * * * *

UNITED STATES PATENT AND TRADEMARK OFFICE
CERTIFICATE OF CORRECTION

PATENT NO. : 10,752,765 B2  Page 1 of 1
APPLICATION NO. : 14/646950
DATED : August 25, 2020
INVENTOR(S) : Croisier et al.

It is certified that error appears in the above-identified patent and that said Letters Patent is hereby corrected as shown below:

In the Drawings

FIG. 5 should be included, as shown below, and duplicate FIG. 7 (a-b) on sheet 6 of 24, should be deleted.

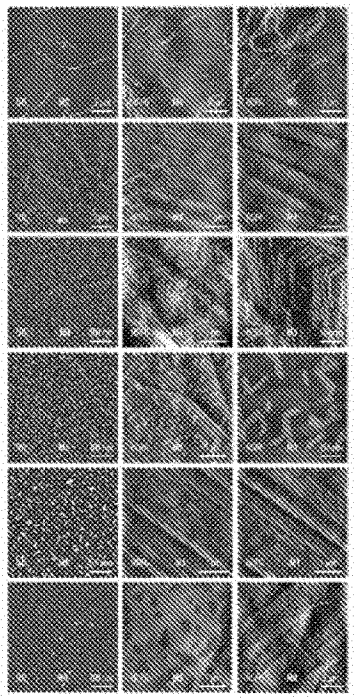

Figure 5

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*